US012060539B2

(12) United States Patent
Labib et al.

(10) Patent No.: US 12,060,539 B2
(45) **Date of Patent: *Aug. 13, 2024**

(54) CLEANING COMPOSITION WITH SUPERABSORBENT POLYMER

(71) Applicant: Novaflux Inc., Princeton, NJ (US)

(72) Inventors: Mohamed Emam Labib, West Palm Beach, FL (US); Stanislav S. Dukhin, Golden Bridge, NY (US); Yacoob Tabani, Basking Ridge, NJ (US); Ching-Yue Lai, Pennington, NJ (US); James L. Manganaro, Princeton, NJ (US); Peter Materna, Metuchen, NJ (US); Jeffrey C. Robertson, Rochester, NY (US); Seo Yean Sohn, Princeton, NJ (US)

(73) Assignee: Novaflux Inc., Princeton, NJ (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/751,186

(22) Filed: May 23, 2022

(65) Prior Publication Data

US 2022/0396752 A1 Dec. 15, 2022

Related U.S. Application Data

(63) Continuation of application No. 16/461,536, filed as application No. PCT/US2019/025558 on Apr. 3, 2019, now Pat. No. 11,345,878.

(Continued)

(51) Int. Cl.

| | |
|---|---|
| ***C11D 17/06*** | (2006.01) |
| ***C11D 3/14*** | (2006.01) |
| ***C11D 11/00*** | (2006.01) |

(52) U.S. Cl.

CPC ................ *C11D 17/06* (2013.01); *C11D 3/14* (2013.01); *C11D 2111/14* (2024.01)

(58) Field of Classification Search

None

See application file for complete search history.

(56) References Cited

U.S. PATENT DOCUMENTS

| | | | |
|---|---|---|---|
| 3,209,771 | A | 10/1965 | Gogarty et al. |
| 3,225,787 | A | 12/1965 | Gogarty et al. |

(Continued)

FOREIGN PATENT DOCUMENTS

| | | | |
|---|---|---|---|
| CA | 2 013 120 | A1 | 10/1990 |
| CA | 2 921 174 | A1 | 2/2015 |

(Continued)

OTHER PUBLICATIONS

Cheng et al., "Water Retention Value Measurements of Cellulosic Materials Using a Centrifuge Technique," BioResources, vol. 5, No. 3, pp. 1945-1954 (2010).

(Continued)

*Primary Examiner* — Nicole M. Buie-Hatcher
*Assistant Examiner* — M. Reza Asdjodi
(74) *Attorney, Agent, or Firm* — Merchant & Gould P.C

(57) ABSTRACT

Provided among other things are a cleaning composition comprising a carrier fluid comprising in the carrier fluid polymer comprising particulate super absorbent polymer (PSAP), wherein the PSAP as in the cleaning composition is substantially at the percolation volume fraction or higher; wherein the cleaning composition can be passed over a surface driven by a pressure drop effective to render the composition traditional biofilm (TBF) cleaning effective and protein cleaning effective.

32 Claims, 7 Drawing Sheets

Related U.S. Application Data

(60) Provisional application No. 62/828,134, filed on Apr. 2, 2019, provisional application No. 62/822,432, filed on Mar. 22, 2019, provisional application No. 62/692,082, filed on Jun. 29, 2018, provisional application No. 62/652,079, filed on Apr. 3, 2018.

(56) References Cited

U.S. PATENT DOCUMENTS 3,852,200 A 12/1974 Meyer
4,003,393 A 1/1977 Jaggard et al.
4,075,316 A 2/1978 Cordon
4,216,026 A 8/1980 Scott
4,254,559 A 3/1981 Purinton, Jr.
4,270,914 A 6/1981 Dahl
4,304,050 A 12/1981 Morud et al.
4,341,807 A 7/1982 Turbak et al.
4,362,713 A 12/1982 Buck
4,374,702 A 2/1983 Turbak et al.
4,378,381 A 3/1983 Turbak et al.
4,406,030 A 9/1983 Platts
4,416,703 A 11/1983 Scott
4,473,408 A 9/1984 Purinton, Jr.
4,481,077 A 11/1984 Herrick
4,500,546 A 2/1985 Turbak et al.
4,525,220 A 6/1985 Sasa et al.
4,543,131 A 9/1985 Purinton, Jr.
4,629,575 A 12/1986 Weibel
4,693,840 A 9/1987 Trinh et al.
4,775,525 A 10/1988 Pera
4,805,598 A 2/1989 Ueda
4,855,128 A 8/1989 Lynch et al.
4,860,821 A 8/1989 Hagewood
4,914,170 A * 4/1990 Chang .................. C08F 220/06 526/240
5,075,104 A 12/1991 Gressel et al.
5,202,112 A 4/1993 Prencipe et al.
5,260,021 A 11/1993 Zeleznick
5,346,339 A 9/1994 Himes et al.
5,362,480 A 11/1994 Au et al.
5,443,801 A 8/1995 Langford
5,512,199 A 4/1996 Khan et al.
5,527,204 A 6/1996 Rhoades
5,681,399 A * 10/1997 Okano .................. B08B 7/0014 134/4
5,703,026 A 12/1997 Setser et al.
5,731,080 A 3/1998 Cousin et al.
5,763,335 A * 6/1998 Hermann .................. B32B 7/12 521/137
5,885,133 A 3/1999 Williams, Jr.
5,998,349 A 12/1999 Guillou
6,027,572 A 2/2000 Labib et al.
6,037,380 A 3/2000 Venables et al.
6,045,623 A 4/2000 Cannon
6,272,713 B1 8/2001 Lotwin
6,288,154 B1 9/2001 Rhoades
6,447,990 B1 9/2002 Alfa
6,506,435 B1 1/2003 Lundberg et al.
6,541,627 B1 4/2003 Ono et al.
6,602,994 B1 8/2003 Cash et al.
6,683,036 B2 1/2004 Foley et al.
6,699,331 B1 3/2004 Kritzler
6,797,245 B2 9/2004 Nakanishi et al.
6,803,107 B2 10/2004 Mitchell et al.
6,849,581 B1 2/2005 Thompson et al.
6,889,400 B2 5/2005 Kawazoe et al.
6,903,057 B1 6/2005 Tsaur
6,905,986 B2 6/2005 Ranganathan et al.
6,967,027 B1 11/2005 Heux et al.
7,037,405 B2 5/2006 Nguyen et al.
7,135,163 B2 11/2006 Winston et al.
7,306,846 B2 12/2007 Dezutter et al.
7,341,623 B2 3/2008 Holl et al.
7,343,972 B2 3/2008 Willingham et al.
7,393,820 B2 7/2008 Soldanski et al.
7,459,028 B2 12/2008 Kral et al.
7,776,807 B2 8/2010 Canto et al.
7,820,873 B2 10/2010 Sun et al.
7,824,608 B2 11/2010 Kuroshima et al.
7,879,289 B2 2/2011 Williams
7,883,726 B2 2/2011 Crutchfield, III
7,888,308 B2 2/2011 Swazey
7,994,111 B2 8/2011 Caggioni et al.
8,097,574 B2 1/2012 Heath et al.
8,187,056 B2 5/2012 Hashish et al.
8,206,349 B2 6/2012 Slenker et al.
8,211,411 B2 7/2012 Deckner et al.
8,357,378 B2 1/2013 Wallace et al.
8,445,422 B2 5/2013 Gonzales et al.
8,466,097 B2 6/2013 Allef et al.
8,546,316 B2 10/2013 Perez-Prat Vinuesa et al.
8,546,558 B2 10/2013 Ankerfors et al.
8,642,529 B2 2/2014 Palla-Venkata et al.
8,703,691 B2 4/2014 Caggioni et al.
8,716,213 B2 5/2014 Caggioni et al.
8,741,855 B2 6/2014 Quave et al.
8,772,359 B2 7/2014 Swazey
8,785,621 B2 7/2014 Flury et al.
8,790,301 B2 7/2014 Slenker et al.
8,795,637 B2 8/2014 Deckner et al.
8,852,643 B2 10/2014 Gonzales et al.
8,920,574 B2 12/2014 Bhaumik et al.
8,980,011 B2 3/2015 Sumnicht et al.
9,045,716 B2 6/2015 Swazey et al.
9,149,274 B2 10/2015 Spivey et al.
9,162,007 B2 10/2015 Bitis et al.
9,163,201 B2 10/2015 Gonzales et al.
9,193,982 B2 11/2015 Sjoede et al.
9,289,449 B2 3/2016 Sershen et al.
9,339,172 B2 5/2016 Slenker et al.
9,370,478 B2 6/2016 Bonner et al.
9,453,156 B2 9/2016 Wu
9,457,453 B2 10/2016 Seth et al.
9,492,373 B2 11/2016 Canova et al.
9,534,191 B2 1/2017 Fernandez-Prieto et al.
9,549,890 B2 1/2017 Bonner et al.
9,616,002 B2 4/2017 Gonzales et al.
9,616,008 B2 4/2017 Bhushan et al.
9,617,459 B2 4/2017 Van Engelen et al.
9,550,597 B2 5/2017 Konya et al.
9,677,030 B2 6/2017 Napolitano
9,693,675 B2 7/2017 Matta et al.
9,796,914 B2 10/2017 Shen et al.
9,826,877 B2 11/2017 DeMarco et al.
9,840,660 B2 12/2017 Chopade et al.
9,862,916 B2 1/2018 Van Engelen et al.
9,884,137 B2 2/2018 Kettlewell et al.
10,100,269 B2 10/2018 Fernandez-Prieto et al.
10,199,269 B2 2/2019 Chen et al.
10,253,457 B2 4/2019 Husband et al.
10,266,792 B2 4/2019 Sivik et al.
10,266,793 B2 4/2019 Labib et al.
10,337,146 B2 7/2019 Holtan et al.
10,337,147 B2 7/2019 Rouse et al.
10,617,791 B2 4/2020 Nunes et al.
10,925,773 B2 2/2021 Riesinger
11,326,128 B2 5/2022 Labib et al.
11,345,878 B2 5/2022 Labib et al.
11,680,226 B2 6/2023 Labib et al.
2001/0011516 A1 8/2001 Cantiani et al.
2003/0121532 A1 7/2003 Coughlin et al.
2003/0191204 A1 10/2003 Hermann et al.
2003/0213501 A1 11/2003 Thomson et al.
2004/0000012 A1 1/2004 Scarpello et al.
2005/0137274 A1* 6/2005 Ko ...................... A61K 31/775 521/64
2005/0201965 A1 9/2005 Kuhlman et al.
2005/0220727 A1 10/2005 Lupia et al.
2006/0020126 A1 1/2006 Kopesky et al.
2006/0032633 A1* 2/2006 Nguyen .................. C09K 8/68 507/924
2006/0034782 A1 2/2006 Brown et al.
2006/0171913 A1 8/2006 Schroder
2006/0249265 A1 11/2006 Scarpello et al.

(56) References Cited

U.S. PATENT DOCUMENTS

| | | | | |
|---|---|---|---|---|
| 2007/0106013 | A1 | 5/2007 | Adachhi et al. | |
| 2007/0141095 | A1 | 6/2007 | Simonnet | |
| 2007/0151680 | A1 | 7/2007 | Scarpello et al. | |
| 2007/0199668 | A1 | 8/2007 | Scarpello et al. | |
| 2008/0082065 | A1 | 4/2008 | Weerawarna et al. | |
| 2008/0082067 | A1 | 4/2008 | Weerawarna et al. | |
| 2008/0108534 | A1* | 5/2008 | Bernard | A61K 8/604 510/119 |
| 2008/0147026 | A1 | 6/2008 | Qin et al. | |
| 2009/0095324 | A1 | 4/2009 | Crowther et al. | |
| 2009/0269376 | A1 | 10/2009 | Lundberg et al. | |
| 2009/0306223 | A1 | 12/2009 | Cai et al. | |
| 2009/0324514 | A1* | 12/2009 | Awad | A01N 31/02 424/722 |
| 2010/0009891 | A1* | 1/2010 | Canto | A61K 8/027 510/418 |
| 2010/0210501 | A1 | 8/2010 | Caggioni et al. | |
| 2010/0221294 | A1 | 9/2010 | Kurek et al. | |
| 2010/0247615 | A1 | 9/2010 | Toreki et al. | |
| 2010/0264364 | A1 | 10/2010 | Wagner et al. | |
| 2011/0262504 | A1 | 10/2011 | Deleersnyder et al. | |
| 2012/0090192 | A1 | 4/2012 | Oevreboe et al. | |
| 2012/0100193 | A1 | 4/2012 | Nowak et al. | |
| 2012/0100367 | A1 | 4/2012 | Holtan et al. | |
| 2012/0237576 | A1 | 9/2012 | Gordon et al. | |
| 2012/0267570 | A1* | 10/2012 | Shi | C08K 5/09 502/402 |
| 2013/0029895 | A1 | 1/2013 | Bettiol et al. | |
| 2013/0072417 | A1 | 3/2013 | Perez-Prat Vinuesa et al. | |
| 2013/0098407 | A1 | 4/2013 | Perlman et al. | |
| 2013/0180679 | A1 | 7/2013 | Laine et al. | |
| 2013/0230609 | A1 | 9/2013 | Modak et al. | |
| 2013/0261208 | A1 | 10/2013 | Borges De Couraca et al. | |
| 2014/0000891 | A1 | 1/2014 | Mahoney et al. | |
| 2014/0128480 | A1 | 5/2014 | Swazey et al. | |
| 2014/0221948 | A1* | 8/2014 | Riesinger | A61L 15/46 424/490 |
| 2014/0238444 | A1 | 8/2014 | Arai | |
| 2015/0031592 | A1 | 1/2015 | Barreleiro et al. | |
| 2015/0191681 | A1 | 7/2015 | Gonzales et al. | |
| 2015/0210957 | A1 | 7/2015 | Napolitano | |
| 2015/0210967 | A1* | 7/2015 | Van Engelen | A61Q 5/12 510/159 |
| 2015/0305819 | A1* | 10/2015 | Krause | A61B 90/70 134/8 |
| 2016/0222275 | A1 | 8/2016 | Galindo et al. | |
| 2016/0312298 | A1* | 10/2016 | Ting | G01N 33/57484 |
| 2016/0325318 | A1* | 11/2016 | Tyrrell | A61L 2/235 |
| 2016/0331703 | A1 | 11/2016 | Myntti | |
| 2016/0332141 | A1* | 11/2016 | Machida | B29B 9/12 |
| 2016/0346427 | A1 | 12/2016 | Nunes et al. | |
| 2016/0367102 | A1* | 12/2016 | DeMarco | A61K 8/72 |
| 2017/0044468 | A1 | 2/2017 | Gori et al. | |
| 2017/0121908 | A1* | 5/2017 | Holtan | D21D 1/20 |
| 2017/0183555 | A1 | 6/2017 | Lillandt et al. | |
| 2017/0191003 | A1 | 7/2017 | Fernandez-Prieto et al. | |
| 2017/0197071 | A1 | 7/2017 | Gottenbos | |
| 2018/0078484 | A1 | 3/2018 | Blell et al. | |
| 2018/0094214 | A1 | 4/2018 | Labib et al. | |
| 2019/0249115 | A1 | 8/2019 | Labib et al. | |
| 2020/0270551 | A1* | 8/2020 | Labib | C11D 17/0026 |
| 2021/0121386 | A1 | 4/2021 | Labib et al. | |
| 2021/0330557 | A1 | 10/2021 | Labib et al. | |

FOREIGN PATENT DOCUMENTS

| | | | |
|---|---|---|---|
| CN | 1163748 | A | 11/1997 |
| CN | 1994268 | A | 7/2007 |
| CN | 103599000 | B | 1/2016 |
| CN | 106691886 | B | 4/2020 |
| EP | 0 198 094 | A1 | 10/1986 |
| EP | 0 392 248 | A1 | 10/1990 |
| EP | 0 845 495 | A2 | 6/1998 |
| EP | 2 100 590 | A1 | 9/2009 |
| EP | 3 081 209 | A1 | 10/2016 |
| EP | 3 033 116 | B1 | 4/2021 |
| JP | 2010-509462 | A | 3/2010 |
| JP | 2011-505340 | A | 2/2011 |
| JP | 2011-513507 | A | 4/2011 |
| JP | 2014-521769 | A | 8/2014 |
| JP | 2014-181247 | A | 9/2014 |
| JP | 2015-508300 | A | 3/2015 |
| JP | WO2013092633 | | 3/2015 |
| JP | 2015-522014 | A | 8/2015 |
| JP | 2016-527065 | A | 9/2016 |
| KR | 10-0555300 | B1 | 3/2006 |
| KR | 10-2009-0071717 | A | 7/2009 |
| KR | 10-1035140 | B1 | 8/2011 |
| TW | I419708 | B | 12/2013 |
| WO | WO 92/18151 | A1 | 10/1992 |
| WO | WO 95/34275 | A1 | 12/1995 |
| WO | WO 00/47628 | A1 | 8/2000 |
| WO | WO 03/040284 | A1 | 5/2003 |
| WO | WO 2006/008645 | A2 | 1/2006 |
| WO | WO 2007/091942 | A1 | 8/2007 |
| WO | WO 2008/109270 | A1 | 9/2008 |
| WO | WO 2009/068841 | A2 | 6/2009 |
| WO | WO 2009/101545 | A1 | 8/2009 |
| WO | WO 2010/070354 | A1 | 6/2010 |
| WO | WO 2012/040314 | A1 | 3/2012 |
| WO | WO 2012/052306 | A1 | 4/2012 |
| WO | WO 2012/065924 | A1 | 5/2012 |
| WO | WO 2012/107648 | A1 | 8/2012 |
| WO | WO 2013/009225 | A1 | 1/2013 |
| WO | WO 2014/003776 | A1 | 1/2014 |
| WO | WO 2014/075845 | A1 | 5/2014 |
| WO | WO 2014/082951 | A2 | 6/2014 |
| WO | WO 2014/088072 | A1 | 6/2014 |
| WO | WO 2014/154348 | A1 | 10/2014 |
| WO | WO 2015/022340 | A1 | 2/2015 |
| WO | WO 2015/180844 | A1 | 12/2015 |
| WO | WO 2016/086951 | A1 | 6/2016 |
| WO | WO 2016/100822 | A1 | 6/2016 |
| WO | WO 2016/166179 | A1 | 10/2016 |
| WO | WO 2018/064284 | A1 | 4/2018 |

OTHER PUBLICATIONS

Homma et al., "Effects of carboxyl-group counter-ions on biodegradation behaviors of TEMPO-oxidized cellulose fibers and nanofibril films," Cellulose, vol. 20, pp. 2505-2515 (2013).

Turbak, "Birth of Nanocellulose," www.naylornetwork.com/ppi-otw/articles/?aid=150993&issuel 0=22333, TAPPI, 4 pages (2011).

Adamcik et al., "Proteins Fibrils from a Polymer Physics Perspective," Macromolecules, vol. 45, pp. 1137-1150 (2012).

Alfa et al., "A novel polytetrafluoroethylene-channel model, which simulates low levels of culturable bacteria in buildup biofilm after repeated endoscope reprocessing," Gastrointestinal Endoscopy, vol. 86, No. 3, pp. 442-451 (2017).

Au et al., "Behaviour of Laponite® gels: rheology, ageing, pH effect and phase state in the presence of dispersant," Chemical Engineering Research and Design, vol. 101, pp. 65-73 (Sep. 2015).

Bolden et al., "The Clinical Effect of a Dentifrice Containing Triclosan and a Copolymer in a Sodium Fluoride/Silica Base on Plaque Formation And Gingivitis: A Six-Month Clinical Study," J Clin Dent, vol. 3, No. 4, pp. 125-131 (1992).

Bonfil et al., "The influence of gingival stimulation on recovery from human experimental gingivitis," Journal of Clinical Periodontology, vol. 12, pp. 828-836 (1985).

Bowen et al., Biology of *Streptococcus mutans*-Derived Glucosyltransferases: Role in Extracellular Matrix Formation of Cariogenic Biofilms, Caries Res, vol. 45, pp. 69-86 (2011).

Chen et al., "Role of electrostatic interactions in cohesion of bacterial biofilms," Applied Microbiology and Biotechnology, vol. 59, pp. 718-720 (2002).

Chu et al., "Smart wormlike micelles," Chemical Society Reviews, vol. 42, pp. 7174-7203 (2013).

Cipriano et al., "Superabsorbent Hydrogels That Are Robust and Highly Stretchable," Macromolecules, vol. 47, pp. 4445-4452 (2014).

(56) References Cited

OTHER PUBLICATIONS

Cubells et al., "The Effect of a Triclosan/Copolymer/Fluoride Dentifrice on Plaque Formation and Gingivitis: A Six-Month Clinical Study," J Clin Dent, vol. 2, No. 3, pp. 63-69 (1991).
De Oliveira et al., "Toothbrushing, inflammation and risk of cardiovascular disease: results from Scottish Health Survey," BMJ, doi: 10.1136/bmj.c2451, 340:c2451 (2010).
Dreiss, "Wormlike micelles: where do we stand? Recent developments, linear rheology and scattering techniques," Soft Matter, vol. 3, pp. 956-970 (2007).
Extended European Search Report for Application No. 19782170.5 mailed Nov. 12, 2021.
Gallob et al., "Comparative Efficacy of a Soft Toothbrush with Tapered-tip Bristles and an ADA Reference Toothbrush on Established Gingivitis and Supragingival Plaque over a 12-Week Period," The Journal of Clinical Dentistry, vol. 27, No. 2, pp. 39-47 (2016).
Gaudino et al., "Adding salt to a surfactant solution: Linear rheological response of the resulting morphologies," Journal of Rheology, vol. 59, No. 6, pp. 1363-1375 (Nov./Dec. 2015).
George et al., Cellulose Nanocrystals: synthesis, functional properties, and applications. Nanotechnology, Science and Applications, vol. 8, pp. 47-54 (2015).
Gloag et al., "Viscoelastic properties of Pseudomonas aeruginosa variant biofilms," Scientific Reports, 8:9691 DOI:10.1038/s41598-018-28009-5 (2018).
Grabenstetter et al., "The measurement of the abrasion of human teeth by dentifrice abrasives: A test utilizing radioactive teeth," J Dent Res, vol. 37, No. 6, pp. 1060-1068 (Nov.-Dec. 1958).
Gusnaniar et al., "Transmission of Monospecies and Dual-Species Biofilms from Smooth to Nanopillared Surfaces," Appl. Environ. Microbiol., vol. 84, Issue 15, e01035-18, 11 pages (Aug. 2018).
Hammer et al., "Cross-Linked Conjugated Polymer Fibrils: Robust Nanowires from Functional Polythiophene Diblock Copolymers," Chemistry of Materials, vol. 23, pp. 4250-4256 (2011).
Heydorn et al., "Quantification of biofilm structures by the novel computer program COMSTAT," Microbiology, vol. 146, pp. 2395-2407 (2000).
International Search Report and Written Opinion for Application No. PCT/US2019/025558 mailed Jul. 22, 2019.
Jayakumar et al, "Role of Dentifrice in plaque removal: A clinical trial," Indian Journal of Dental Research, vol. 21, Issue 2, pp. 213-217 (Apr.-Jun. 2010).
Kerr et al., "Chemical Composition and In-vitro Digestibility of Thermochemically Treated Peanut Hulls," J. Sci. Food Agric., vol. 37, pp. 632-636 (1986).
Khosravi et al., "Use of an oxygen planar optode to assess the effect of high velocity microsprays on oxygen penetration in a human dental biofilms in-vitro," BMC Oral Health 20:230 https://doi.org/10.1186/s12903-020-01217-0 (2020).
Kolenbrander et al., "Adhere Today, Here Tomorrow: Oral Bacterial Adherence," Journal of Bacteriology, vol. 175, No. 11, pp. 3247-3252 (Jun. 1993).
Koo et al., "Exopolysaccharides Produced by *Streptococcus mutans* Glucosyltransferases Modulate the Establishment of Microcolonies within Multispecies Biofilms," Journal of Bacteriology, vol. 192, No. 12, pp. 3024-3032 (Jun. 2010).
Lewis et al. "Interaction between toothbrushes and toothpaste abrasive particles in simulated tooth cleaning," Wear, vol. 257, No. 3-4, pp. 368-376 (2004).
Mateu et al., "A Clinical Investigation of the Efficacy of Two Dentifrices for Controlling Established Supragingival Plaque and Gingivitis," J Clin Dent, vol. 19, No. 3, pp. 85-94 (2008).
Mignon et al, "Superabsorbent polymers: A review on the characteristics and applications of synthetic, polysaccharide-based semi-synthetic and 'smart' derivatives," European Polymer Journal, vol. 117, pp. 165-178 (2019).
Morozova, "Methylcellulose fibrils: a mini review," Polymer International, vol. 69, No. 2, pp. 125-130 (2020).
Palmer et al., "*Streptococcus mutans* yidC1 and yidC2 Impact Cell Envelope Biogenesis, the Biofilm Matrix, and Biofilm Biophysical Properties," Journal of Bacteriology, vol. 201, Issue 1, e00396-18, https://doi.org/10.1128/JB.00396-18, (Jan. 2019).
Paraskevas et al., Additional Effect of Dentifrices on the Instant Efficacy of Toothbrushing, J Periodontology, vol. 77, No. 9, pp. 1522-1527 (2006).
Perazzo et al., "Flow-induced gelation of microfiber suspensions," Proceedings of the National Academy of Sciences, 114(41):201710927, DOI:10.1073/pnas.1710927114, E8557-E8564 (2017).
Perazzo et al, "Emulsions in porous media: From single droplet behavior to applications for oil recovery," Advances in Colloid and Interface Sciences, vol. 256, pp. 305-325 (2018).
Pointner et al., "Composition of corncobs as a substrate for fermentations of biofuels," Agronomy Research, vol. 12, No. 2, pp. 391-396 (2014).
Rizvi et al., "Dispersed polypropylene fibrils improve the foaming ability of a polyethylene matrix," Polymer, vol. 55, No. 16, pp. 4199-4205 (2014).
Rmaile et al., "Microbial tribology and disruption of dental plaque bacterial biofilms," Wear, vol. 306, Issues 1-2, pp. 276-284 (Aug. 30, 2013).
Schemehorn et al., "Abrasion, Polishing, and Stain Removal Characteristics of Various Commercial Dentifrices In Vitro," J Clin Dent, vol. 22, No. 11, pp. 11-18 (2011).
Sharma et al., "The Clinical Effects on Plaque and Gingivitis Over Three-Months Use of Four Complex-Design Manual Toothbrushes," J Clin Dent, vol. 5, No. 4, pp. 114-118 (1994).
Stoodley et al., "Structural Deformation of Bacterial Biofilms Caused by Short-Term Fluctuations in Fluid Shear: An In Situ Investigation of Biofilm Rheology," Biotechnology and Bioengineering, vol. 65, No. 1, pp. 83-92 (Oct. 5, 1999).
Tavakolian, et al., "A Review on Surface Functionalized Cellulosic Nanostructures as Biocompatible Antibacterial Materials," Nano-Micro Lett. 12, 73 (2020). https://doi.org/10.1007/s40820-020-0408-4.
Valkenburg et al., "Does Dentifrice Use Help to Remove Plaque? A Systematic Review," Journal of Clinical Periodontology, vol. 43, pp. 1050-1058, doi: 10.1111/jcpe.12615 (2016).
Van der Rijt et al., "Micromechanical Testing of Individual Collagen Fibrils," Macromolecular Bioscience, vol. 6, pp. 697-702 (2006).
Verkaik et al., "Oral biofilm models for mechanical plaque removal," Clin. Oral. Invest., vol. 14, pp. 403-409 (2010).
Vinogradov et al., "Rheology of biofilms formed from the dental plaque pathogen *Streptococcus mutans*," Biofilms, vol. 1, pp. 49-56 (2004).
Volpatti et al., "Polymer Physics Inspired Approaches for the Study of the Mechanical Properties of Amyloid Fibrils," Journal of Polymer Science, Part B: Polymer Physics, vol. 52, pp. 281-292 (2014).
Walsh et al., "Fluoride toothpastes of Different Concentrations for Preventing Dental Caries (Review)," Cochrane Database of Systematic Reviews, Issue 3. Art. No. CD007868 DOI: 10.1002/14651858.CD007868.pub3 (2019).
Yang et al., "Structural and Ecofriendly Holocellulose Materials from Wood: Microscale Fibers and Nanoscale Fibrils," Advanced Materials, 2001118 (2020).
Yu et al., "Scalable manufacturing of biomimetic moldable hydrogels for industrial applications," PNAS, vol. 113, No. 50, pp. 14255-14260 (Dec. 13, 2016).
Yumoto et al., "The Pathogenic Factors from Oral Streptococci for Systemic Diseases," Int. J. Mol. Sci., 2019, 20, 4571; doi:10.3390/ijms20184571, pp. 1-18.
Zanatta et al., "Supragingival Plaque Removal with and without Dentifrice: A Randomized Controlled Clinical Trial," Braz. Dent J., vol. 23, No. 3, pp. 235-240 (2012).
Exhibit A—the pending claims U.S. Appl. No. 17/737,654.
Exhibit B—the pending claims U.S. Appl. No. 17/062,424.
Exhibit C—the pending claims U.S. Appl. No. 17/225,049.
Japanese Office Action dated Jan. 24, 2023 for Japanese Patent Application No. 2021-503703 (English Translation).

* cited by examiner

CLEANING COMPOSITION WITH SUPERABSORBENT POLYMER

CROSS REFERENCE TO RELATED APPLICATIONS

The present application is a continuing application of U.S. Ser. No. 16/461,536, filed May 16, 2019. U.S. Ser. No. 16/461,536, is a US national stage application of PCT/US2019/025558, filed Apr. 3, 2019. PCT/US2019/025558 claims benefit of Provisional Ser. No. 62/652,079 filed Apr. 3, 2018; Provisional Ser. No. 62/692,082, filed Jun. 29, 2018; Provisional Ser. No. 62/822,432, filed Mar. 22, 2019; and Provisional Ser. No. 62/828,134, filed Apr. 2, 2019. A claim of priority is made to each of U.S. Ser. No. 16/461,536, PCT/US2019/025558, U.S. Provisional Serial Nos. 62/652,079; 62/692,082; 62/822,432; and 62/828,134 to the extent appropriate. The disclosure of each of U.S. Ser. No. 16/461,536, PCT/US2019/025558, U.S. Provisional Serial Nos. 62/652,079; 62/692,082; 62/822,432; and 62/828,134 are incorporated herein in their entirety.

Embodiments of the invention pertain to cleaning and disinfecting of surfaces in the broadest sense, such as of medical devices, skin, mucosal surfaces, complex structure inside or outside the body of a host, and particularly medical devices that have lumens.

Embodiments of the invention pertain to compositions, methods and apparatuses for the decontamination, cleaning, sanitization, disinfection, sterilization, storing in disinfected or sterilized condition, and treatment, of long narrow lumens, channels and tubes such as in endoscopes, other luminal medical devices as well as other surfaces irrespective of geometries or material of construction.

Although the invention is applicable to many fields, the invention was inspired by the issues involved in cleaning and sterilizing endoscopes, and the long narrow channels found in these devices. Infections traced to endoscopes have been a tremendous problem, yet the mechanical complexity of the devices means that it has been impractical to utilize single use devices, and even the components cannot at this time be switched out with single use components. The construction and heat-sensitive materials of flexible endoscopes generally preclude the use of high temperature steam for sterilization, and the long length and the small cross-sectional size of the various internal tubing channels cause fundamental difficulty in cleaning, disinfecting, and sterilizing these channels. While there are many examples of serious infection reported, a particularly serious report was of two patient deaths at the UCLA Medical Center in 2015 from carbapenem-resistant Enterobacteriaceae (CRE) infection transmitted by contaminated duodenoscopes, namely Endoscopic Retrograde Cholangiopancreatography (ERCP) Duodenoscopes. CRE contamination has been linked to biofilm growth in ERCP endoscopes, and this biofilm can be related to the often inability to clean the internal channels of the endoscope or other parts of the elevator section of the endoscope.

In addition to the narrow inside diameter of SB and narrower channels, another challenge is that the material used for the channels, most frequently Teflon®, is resistant to wetting with aqueous fluids, making it more likely that patches of material are not effectively contacted with cleaning fluids (such as rinse agents, cleaners, disinfectants, sterilants, enzyme solutions, and the like). This lack of wetting can also affect high-level disinfectants such as glutaraldehyde, hydrogen peroxide, ortho-phthalaldehyde, peracetic acid, and the like. The narrow inside diameter of these channels, and the pressure limits on their operation, mean that the hydrodynamic detachment force that can be generated by conventional flow is limited.

Biofilms are highly resistant to standard cleaning, and a common cause of infectious diseases, especially from medical devices. Biofilms adhere on surfaces utilizing layers of extracellular polysaccharide substances (EPS) in which the microorganisms are embedded. EPS provide biofilm structural stability and also protection from environmental factors such as antimicrobial substances. Though organisms may be dormant in a biofilm, the biofilm will release bacteria in the more infectious planktonic form. Medical devices tend to form strongly adherent biofilms that can be modeled with the "built-up biofilm" (BBF) described by Alfa et al., Gastrointestinal Endoscopy 85(5), Supplement, pp. AB67-AB68, 2017. For the purposes of this application, BBF is as described in ¶0061 and Example 2 of WO2018064284A1. Modeling can also be done with less adherent biofilm models, such as traditional biofilm (TBF). For the purposes of this application, BBF is as described in Example 1 of WO2018064284A1.

WO2018064284A1 describes cleaning biofilms in endoscope channels with gels or other high viscosity fluids pumped through these channels at pressures falling within the operating parameters for an endoscope (e.g., 28 psi) can provide shear stress on the surfaces of the channels higher than that of conventional water-based cleaners to more effectively remove contaminants. According to WO'284, still more effective are compositions containing Minute Fibrils (MFs) as that term is defined in ¶0026 of WO'284, and below. MF include microfibrillated celluloses (MFCs). These MF compositions typically contain traditional cleaning agents, and can further include stiffening polymers or particles such as microcrystalline cellulose (MCC) or silicified MCC (SMCC) or silica, and additional polymer added in amounts effective to increase the yield shear stress of the composition. The MF compositions, MF compositions with stiffening polymer or additional polymer, or MF compositions with both stiffening polymer or particles, or additional polymer are effective against BBF in narrow channels. With the right choice of stiffening polymer or additional polymer or particles, the last option can be the most effective.

In experiments, super absorbent polymer (SAP) was added as an additional polymer, with the idea that it could reduce dewatering, a process whereby some segments of composition formed water pockets, which are believed to be segments that are less effective in cleaning. Unexpectedly, SAPs particulate super absorbent polymers (PSAPs) increased cleaning efficiency far beyond what might be expected from reducing dewatering.

What is now discovered is that where all or a portion of the additional polymer is a particulate super absorbent polymer (PSAP) with the right characteristics, the composition is remarkably more effective in removing BBF. For instance, if one monitors stained BBF in a 1.37 mm ID Teflon tube, where MF compositions without SAP take 6 to 12 minutes flow at 5 mL/min flowrate to achieve stain removal, with SAP the stain removal can occur in 20 to 120 seconds. In effect, it appears that while the MF compositions of WO'284 serially remove a portion of the BBF as each segment of composition flows past, with the PSAP formulations, each pass of composition can take all or at least a much more substantial portion of the BBF.

A further surprise is that, while generally not as effective as MF-PSAP compositions, SAP compositions without MF are effective in removing biofilm.

Thus, the very substantial improvement in cleaning found in WO'284, is notably improved still further by the current disclosure.

SUMMARY

Cleaning compositions comprising a PSAP, PSAP and MF, the forgoing in conjunction with solid particles, in accordance with the present invention, substantially as shown in and/or described in connection with at least one of the figures, as set forth more completely in the claims, are disclosed. Various advantages, aspects, and novel features of the present disclosure, as well as details of an exemplary embodiment thereof, will be more fully understood from the following description and drawings.

The foregoing summary is not intended, and should not be contemplated, to describe each embodiment or every implementation described in the disclosure. Other and further embodiments of the present invention are described below.

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

Figure 1:
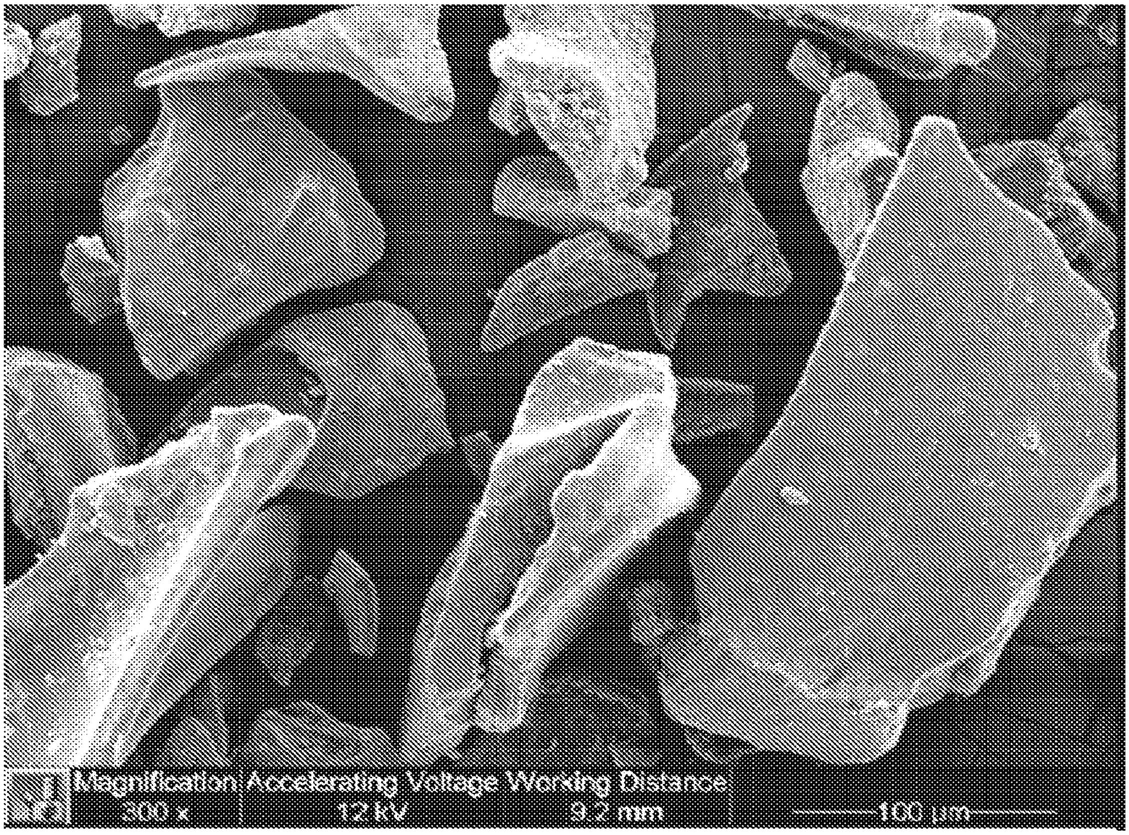
FIG. 1 is an SEM image of PSAP particles.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

Theoretical Considerations in Cleaning

For simple Newtonian viscous fluids, for laminar flow in a tube of circular cross-section, the velocity profile is parabolic as a function of radial position. Also, the boundary condition at the wall is that the velocity of the fluid at the wall is zero. The velocity gradient near the wall defines the shear stress exerted at the wall. For conditions of practical interest for endoscopes, involving parameters such as channel length and allowable pressure applied to the endoscope channel, this shear stress is not adequate to remove most biofilm.

In embodiments of the invention, compositions can have shear-thinning properties and can have a desired yield shear stress between 1 Pa and 100 Pa, such as between 6 Pa and 100 Pa. It is believed that such composition flows with a velocity distribution that is not the traditional parabolic distribution, but rather has a flatter velocity distribution near the center of the flow and a steeper velocity gradient near the wall. The shear-thinning property can be expected to keep the yielded region near the wall moving, while the central plug of fluid remains relatively undeformed, moving as a plug.

It is further believed that, at velocities or shear rate that are not too large, such composition of embodiments of the invention can be caused to flow as an intact network or body in most of the interior of the flow, and in the immediate vicinity of the wall the network is more broken up. In such situation there is established a plug-like flow that places most of the velocity gradient in a narrow region near the wall. In general, a steeper velocity gradient near the wall corresponds to a greater shear stress at the wall, at least in the sense of general or averaged shear stress.

For a network that carries solid particles entangled in the network, it is believed that sometimes the solid particles, traveling with a local velocity near the wall, will actually touch or scrape the wall with a velocity. Thus, at least at isolated locations of contact, the situation overcomes or violates the boundary condition requirement of traditional flow of simple fluids, namely that the fluid velocity have a value of zero at the wall itself. Further in connection with such scraping, it is believed to be helpful for the frictional/scraping entities, which may be Minute Fibrils or solid particles or both, or to be harder than the contaminant, and for the Minute Fibrils or a scraping entity to have at least a certain stiffness.

SAP may remove contaminants by yet another physical mechanism. It is believed that SAP may locally form attachments with contaminants and may then rip pieces of such contaminants away from the wall or whatever they are attached to. Again, this may occur on a localized instantaneous basis such that the detachment forces applied locally and instantaneously may be greater than the average shear forces that would occur with a uniform fluid.

Without being bound by theory, when polymer and solid are combined together in a liquid vehicle according to embodiments of the invention, it is believed useful if the ingredients fill or nearly fill the entire volume space of the composition to an extent that the composition is about or near or more concentrated than the percolation volume fraction as is known in physics or material science. Within the inventive composition, the above components may either touch each other or entangle with each other to make contact so that when during flow they can make contact or near contact with the channel surface or with the surface to be cleaned, independent of geometry. The above components of the inventive composition may become involved in creating localized high shear stresses during flow or effectively increase the bulk shear stress or both. The degree of space filling may preferably be sufficient to create the localized shear stress levels suitable to remove the contaminant such as BBF from a channel surface. It is believed that localized shear stress plays a role in cleaning.

Considerations on PSAP

The PSAP of the invention is particulate in the dry form, and substantially in the composition vehicle (solution components of the cleaning composition). In the swollen form, its volume can be significantly greater than in dry form, such as 10-fold or more. SAPs can be such that at the concentrations that are useful in the invention have the particles coalesce such that particle boundaries cannot be seen. Too much such coalescence is believed to be detrimental to cleaning. A practical measurement of when SAP has a sufficient particle character is when a cleaning composition is pushed through a 1.37 mm ID tube of 6 ft. length. A cleaning composition with SAP has, as defined in this context, PSAP character if at 20 psi the composition moves at about 3 mL/min or better. In general SAP that is not sufficiently PSAP in character becomes extremely viscous, such that flow rates of even 1 mL/min are uncommon.

SEM analysis of cleaning compositions that function as PSAP tend to show that most of the particles are recognizable as distinct particles, even if for some there are portions that have some coalescence with adjacent particles. In embodiments, 50% or more of the particles are recognizably particles.

A preliminary test for whether a composition will have PSAP character is to swell the polymers in deionized water with SAP at 0.75% wt/wt. If the resulting material gels, and has Newtonian flow properties (no shear thinking, no shear thickening), the composition is less likely to be useful. Some auxiliary polymers can have the function of helping to keep SAP particles separate. MFs can have this function. Additionally, other high molecular weight polymers such as polyacrylamide (e.g., MW 5 to 6 million daltons) can have this function (possibly by steric stabilization or wrapping). It is believed that amounts for non-MF auxiliary polymers should be from about 20 ppm to about 1,000 ppm. Thus, in some instances the test is made with the auxiliary polymer present. More favorable results of the test show significant particles settling, instead of gelling.

Minute Fibrils such as microfibrillated cellulose (MFC) also have some water absorption capacity. However, MFs are fibrous, whereas PSAP is comprised of polymeric particles that are not fibrous. As described further below, generally PSAP is uniformed crosslinked, or interiorly uniformly crosslinked with the exterior more densely crosslinked. In any case, the structure does not touch on a fibrous structure.

In embodiments, the PSAP used in the invention has a centrifuge retention capacity (CRC) in the composition vehicle of about 30 to about 100 g/g (i.e., weight increase after swelling in vehicle as draining excess fluid at 250 G for 3 min). In embodiments, the PSAP used in the invention has a centrifuge retention capacity (CRC) in deionized water of about 30 (or 50) to about 500 g/g, or about 30 to about 180 g/g, or about 30 to about 100 g/g, or about 30 to about 80 or 88 g/g. In embodiments, the PSAP used in the invention has a centrifuge retention capacity (CRC) in phosphate buffered saline of about 16 to about 32 g/g. SAPs can have much higher CRC values, particularly when used commercially to suspend fluids containing particulate matter.

In embodiments, the PSAP used in the invention has dry particle size from about 2 to about 800 or about 900 micrometers, for from about 2 to about 500 micrometers. Particle size is measured by sieving or photographic sampling.

In use, the composition with PSAP is generally at about or above the percolation volume fraction (PVF) of PSAP as in the cleaning composition. For the purposes of this application, the PVF can be measured by any of the following measurements or estimates: (1) A concentration where with added PSAP (and other polymers held the same) the change conductivity has a marked upward change; or (2) A concentration where after spinning at 2,130 G for 10 minutes, the volume of clear water is 40% or less. PVF is a concept that is meaningful in the context of this application for swollen PSAP. The volume fraction as determined by the centrifugation method may be considered as an indication of apparent volume fraction, where most of the interstitial water is excluded from the composition during centrifugation.

In embodiments, the composition is substantially at the PVF or higher, meaning at a solids fraction of about 55% or higher. Here, solids refers to the sum of the volume of swollen PSAP, Minute Fibrils if present, and solid particles if present.

Superabsorbent polymers are typically made from the polymerization of monomers such acrylic acid or acrylates blended with sodium hydroxide in the presence of an initiator and crosslinking agents to form for example a poly-acrylic acid sodium salt (sometimes referred to as sodium polyacrylate). Cations other than sodium can be used including potassium, ammonium and others. Polyacrylate polymer is the most common type of SAP made today. For example, the SAP can have a water absorption (in g/g) that is larger than the water absorption of the Minute Fibrils such as MFC, if such an ingredient is present in the composition. In embodiments of the invention, we do not wish to be limited to the chemistry of the polymer or copolymer or the particle size. The superabsorbent can be synthetic, natural or their combination including modified natural materials that underwent chemical modification such as starch-acrylamide or the like. For example, the polymer can be based polyacrylamide, with the water binding believed to be based on a hydrogen-bonding network.

The SAP can be anionic, cationic, amphoteric, neutral zwitterionic, or mixtures thereof as desired or as required by the use or function.

Superabsorbent polymers (SAP) are usually crosslinked. SAP polymers can be surface crosslinked or not surface crosslinked, and can be made by solution, suspension or inverse phase polymerization or their combinations. SAPs can be made in a single step or in multiple steps. We do not wish to be limited to one form or another of SAP, and our definition here includes all forms of superabsorbents whether they are made by organic synthesis or whether they are natural such as forms of starch or whether they include both natural or synthetic or their combinations such as starch-acrylamide or the like.

The invention uses PSAPs, which generally is believed to mean that they are surface crosslinked, or more generally crosslinked at a density that prevents particle coalescence in the working cleaning composition.

Cleaning compositions including a PSAP, which may or may not include microfibrillated cellulose, is believed to be useful in any of several ways. As discussed above, they provide cleaning or enhanced cleaning. The PSAP can decrease the likelihood or extent of dewatering possibly because of its ability to absorb or suck up water and in this way it may minimize segregation or separation during storage or during cleaning or during flow. PSAP particles may also be deformable when in the swollen state and thus can reduce the possibility of clogging during cleaning of narrow channels such as found in endoscopes.

In U.S. Ser. No. 62/828,134 filed Apr. 2, 2019 (NOVA004P4), at pp. 18-19, are found SEM images of useful PSAP particles in the dry state. The images include images at 100× and 300×. Samples include Tramfloc 1001B (cross-linked copolymer of acrylamide and potassium acrylate) from Tramfloc, Inc., Spring, TX, AQUASORB 3005 KC (polyacrylamide) from SNF Inc of Riceboro, Ga., and Cabloc CTM (polyacrylate) from Evonik Corp., Greensboro, NC .SEM photographs have to be taken in a vacuum, such that any water would evaporate anyway so the photographs have to be of a specimen that is in a dry condition. FIG. 1 in this application is illustrative. It shows Tramfloc 1001B PSAP at 300×. It shows sharp edges, similar to cleavages seen with stone. In embodiments, such sharp edges are preferred. The sharp edges are expected to be present in the swollen state. The irregular shapes shown can imply that in the cleaning composition the shear forces may be non-uniform when such compositions flow over a surface. In embodiments, this is desirable, providing areas of high localized shear stress, which over time can comprise most of the surface.

In embodiments, the majority of PSAP particles are irregular in shape, have sharp edges and flat surfaces. In embodiments, substantially all (80% or more by weight) are surface crosslinked or more highly bulk crosslinked. Another motivation for using such crosslinked SAP, beyond avoiding coalescence, is that some SAP might not have sufficient stiffness to effect friction, erosion or abrasion of contaminants. Further, greater stiffness may provide a greater storage modulus, G'.

U.S. Ser. No. 62/828,134 filed Apr. 2, 2019 (NOVA004P4) also shows images of PSAPs that lack sharp edges, such as Aquakeep 10S, Aquakeep CA180N and Aquakeep SA60N (Sumitomo Seika Chemicals Co. Ltd., Tokyo, JP). It is believed that the rounded products of these images are made by suspension polymerization, and that the particles are not surface cross-linked. A variation on this is a grouping of nearly-spherical particles stuck together as an aggregate, resembling a bunch of grapes. From experimental experience so far, these rounded materials are less effective than crystal-shaped or irregular-shaped PSAPs having edges and corners and non-spherical shape. It may be that the very nearly spherical shapes rolled past and among each other easily, may roll over the surface as well during flow. Moreover, the spherical shapes can present less surface area to the surface to be cleaned.

A mixture of rough-shaped PSAP with spherical SAP can yield compositions that flow better in narrow than compositions with spherical SAP alone or rough-shaped PSAP alone.

Another process and resulting product is SAP that is formed by solution polymerization, followed by calendaring or extrusion, followed by drying and grinding. With this process, the resulting particles tend to be flat or irregular and they look like crystals or shattered glass and are sometimes described as crystal-like, though technically SAP material is not crystalline. SAP made by such shattering or cleaving processes have apparent cleavage surfaces, as can be seen in the images referenced above. This process can optionally be followed by another cross-linking step.

Following drying and grinding, some SAPs are surface crosslinked. This is believed to help contain the particles in the swollen state such that they do not coalesce. A higher density of a more uniform crosslinking can also help avoid coalescence. Highly bulk crosslinked SAP is made during the main single solution crosslinking step and this is followed by calendaring and grinding. Such a product is mostly used in cable-lock applications. Examples of this latter form can have for example CRC values for deionized water of about 20 to about 50, or about 28 to about 32. An exemplary source of this type of PSAP is Stewart Superabsorbents Company, Hickory, NC Surface crosslinking can for example be effected with a water-based crosslinking system, while the interior of the SAP defines a non-ionized, more hydrophobic phase.

In some SAP manufacturings, after the particles are obtained from the suspension or solution polymerization process, the particles are ground to form smaller particles. It is believed that such ground particles can have, as their exposed surfaces, a mixture of harder material and softer material, and quite possibly some of the resulting particles have exposed surfaces that are entirely soft material that was originally in the interior of the suspension-polymerized particles. The resulting particles, after grinding or breaking-up, have irregular, generally non-spherical morphologies, because of having been broken up during grinding, and many of the exposed surfaces are non-cross-linked or lightly crosslinked. This material runs a risk of inducing coalescence, but the test is whether the material performs as a PSAP. This material can be surface crosslinked to reduce the risk of coalescence. Keeping a useful amount SAP particle integrity is believed to be associated with creating high localized shear stress during flow at a cleaning surface of a channel, and this is believed to be useful in removing contaminants.

In embodiments, the composition comprises two classes of SAPs, such that one of them is softer than the other. The softer one may swell more and fill volume and absorb excess water; on the other hand, the one which is harder such as more crosslinked or surface crosslinked, will swell less and the harder one can create more grip or friction or erosion of the contaminant.

In terms of angles found in embodiments of the PSAP particles, in terms of the sharpest angle visible on a particular particle, the included angle, in almost all cases (such as in 80% or more of the particles that were measured for angled particle compositions), is less than 90 degrees. In some powders, a majority of the measured particles have an included angle that is less than 70 degrees. In some of the tables presented here, at least one-third of the measured particles have an included angle that is less than 40 degrees.

In terms of ratios of overall dimensions of such angled particles, it can be described that of the particles for which measurements of three different dimensions (including a depth dimension) were able to be taken or estimated, a ratio of maximum dimension to minimum dimension is greater than 2 for a majority of the particles. In fact, for a majority of the particles, such a ratio was greater than 4. Of course, for a sphere, the dimension in any direction would be the same, and so such a ratio would be one. So, the larger the ratio, the more the particle departs from spherical.

It is also possible to identify a corner of the particle and to quantify a radius of curvature of the edge of the particle at that corner. The sharper corner, the smaller is the radius of curvature. In terms of radius of curvature (absolute value), it can be described that at least some of the particles can have a measured radius of curvature that is smaller than 100 microns, or smaller than 50 microns. In the case of some of the powders, at least a majority (more than half) of the particles measured have a radius of curvature at some corner that is less than 20 microns.

It is also possible to present the radius of curvature describing it in a more dimensionless way, i.e., it is possible to calculate a ratio of the radius of curvature of a sharp corner divided by the largest measured dimension of the particle (referred to as the length of the particle). Similarly, it is also possible to calculate a ratio of the radius of curvature of a sharp corner divided by another dimension of the particle, which might be described as a next-largest principal dimension of the particle (referred to as the width of the particle). It can be described that at least a majority of the particles of the superabsorbent polymer have a ratio of corner radius of curvature to maximum overall dimension that is less than 0.3, or less than 0.2.

In embodiments where PSAP is used with MF, in some cases the majority of the space may be occupied by SAP with MFC occupying a smaller volume.

While not being bound by theory, it is believed that the surfaces that PSAP presents to biofilm have the ability to interact (or adhere) with the biofilm, whether by hydrogen bonding, ionic interactions, hydrophobic interactions, entanglements, geometrical effects, or the like. Such possible forces further include electrostatic interactions, capillary forces, entrapment, osmotic forces, removal by wicking, capillary effects, hydrogen bonding, viscous forces due to flow of entities at very small distances from the surface on the nanometer scale, surface forces, friction, abrasion, erosion or any of various combinations of the above forces. As such, it is believed that these can help tear off or slough off larger pieces of biofilm. PSAP and other components can contribute to removal with friction-assisted mechanisms.

A number of sources of PSAP useful in the invention are set forth in Provisional patent application U.S. Ser. No. 62/828,134 filed Apr. 2, 2019 (NOVA004P4), at p. 113.

PSAP Cleaning Compositions Lacking MF

PSAP compositions lacking MF were found to be more effective at higher pH of about 9 to 11, compared to those at lower pH. The concentration of PSAP in such formulations may be from about 0.1% or 0.2% to about 3% by weight depending on the type of the PSAP material. Other factors influencing the concentration that is useful include salt concentration or ionic strength, solvents such as alcohols, glycols or polyethylene glycols (PEGs), type of ions used in solution, pH and surfactant. A concentration near or above PVP is desirable. Such compositions are effective against TBF and against lesser "BBF's," such as grown for 1 to 4 days, instead of the full BBF protocol. Ultrez 10 brand Carbopol (Lubrizol Corp., Wickliffe, Ohio), which as used did not meet the functional test for being a PSAP, was found notably less effective. The Ultrez 10 material was also undesirably small in terms of structures that it forms in the composition, namely less than 2 microns in the swollen state.

PSAP compositions lacking MF can be expected to be effective if used with sufficient frequency to avoid formation of strongly adherent biofilm. Also, such compositions can be used between cleanings with PSAP and MF. Moreover, with the proper selection of PSAP and solid particles, these compositions can be expected to effectively clean BBF.

PSAP Plus Solid Particles

In embodiments, these compositions are non-Newtonian and shear thinning and have viscosity between 3,000 to about 10,000 mPa-s at a shear rate of 1/sec. Such compositions are effective to clean BBF.

PSAP Plus MF but Minus Solid Particles

Minute Fibrils unexpectedly modify the properties and rheology of SAP compositions in three ways: 1) the compositions are transformed into a highly non-Newtonian viscoelastic fluids with high shear-thinning properties whereas the PSAP-alone compositions are nearly Newtonian; 2) the compositions became much more stable and did not separate upon standing for extended periods of time; and 3) the flowrate in narrow channels have becomes 5 to 10 times larger, such as to be practical for use in commercial cleaning of endoscope channels.

Optical microscopic examination of compositions based on PSAPs and MFs appears to show that the MFs form a network and that the thicker branches of such network is located in spaces between SAP particles. When surface-crosslinked PSAPs such as those obtained from Stewart Superabsorbents are used, the crystal-like PSAP particles appear to be lying flat and making large contact surface area with the surface of the channel. The PSAPs and fibrillated network components of the composition appear, under the microscope (SEM), to exist as distinct phases and may be intermingled together in some fashion. One phase comprises the PSAP particles and the other phase comprises the fibrillated network. Such phases may be continuous or co-continuous or one phase may present within the other. The minute fibrils may appear to provide a coating of the SAP particles. During flow both phases are believed come in contact with the surface, meaning that at a given time some portions of the surface may experience contact with the SAP particles and other portions of the surface may experience contact with the fibrillated network. Over time, the same surface spots would experience SAP contact for some moments and may become in contact with minute fibril network for some moments during cleaning.

PSAP Plus MF Plus Solid Particles

Compositions with this combination have been found to be extremely rapid in removing BBF.

Composition Rheology

A composition according to the invention generally can be described with respect to storage modulus G', which describes the elastic properties, and, the loss modulus, which describes the viscous properties. Both quantities can be measured in units of Pascals. An Anton Paar Physica RM 501 Rheometer operating with a 25 mm and a 50 mm parallel plate at 1 mm or 2 mm gap distance (as instructed by the manufacturer) is used. G' and G" measurements were performed as a function of strain and strain rate in rad/s. In addition, amplitude sweeps were performed as a function of shear stress (Pa). All measurements are made at room temperature.

Generally, a composition of the invention will be viscoelastic (VE) in that at the start of the G" and G' measurement at 0.1 percent shear strain (or 0 rad/s in some embodiments) G' is higher than G". VE properties can be adjusted for example by adjusting the MF content, the PSAP content or solid particles content, or combinations thereof. VE may also be affected by selecting certain surfactants such as liquid crystal surfactants. Surfactants that form non-spherical micelles such as worm-shaped micelles can be useful.

In embodiments, G' is 200 Pa or higher. In embodiments, G' is 250 Pa or higher. In embodiments, G' is 400 Pa or higher. In embodiments, G' is 500 Pa or higher. In embodiments, G' is 600 Pa or higher. In embodiments, G' is 1,000 Pa or higher. In embodiments, G' is 1,500 Pa or higher. In embodiments, G' is 2,000 Pa or higher. In embodiments, G' is 3,500 Pa or less.

Without being bound by theory, it is believed that if the elastic or storage modulus of the composition is in the same range or larger than that of the biofilm, this may cause intimate interaction or contact of the composition and the biofilm during flow. Thus, cleaning is improved.

At larger strains, this G' to G" relation for VE compositions is typically reversed. The point where the two curves intersect represents the yield point of the material (yield shear stress). In embodiments, the cleaning composition has a yield shear stress of more than 1 Pa, such as more than 5 or 6 Pa. In embodiments, the yield shear stress is more than 20 Pa. In embodiments, the yield shear stress is more than 30 Pa. In embodiments, the yield shear stress is more than 42 Pa. In some cases the yield shear stress can be for example as high as 120 or 130 Pa In embodiments, the loss modulus G" (at 0.1 percent shear strain) is less than 500 Pa. In embodiments, G" is less than 200 Pa. In embodiments, G" is less than 100 Pa. In embodiments, G" is less than 50 Pa. In embodiments, G" is less than 30 Pa. A large viscous component (G") is generally not desirable for present cleaning, especially at 0.1% shear strain or less than 0.2% or less than 1%.

Cleaning compositions can have for example viscosities of greater than 100 mPa-s or greater than 5000 mPa-s at a shear of 0.1 percent as measured by a Brookfield type viscometer, or from 100 to 1000 mPa-s, or from 500 to 9000 mPa-s, or from 500 to 5000 mPa-s, or from 4,000 to 9,000 mPa-s.

For endoscopes, flow rates of the inventive compositions can be in the range from 1 ml/minute to 20 ml/minute in narrow channels (e.g., <2 mm) and from 30 to 130 ml/minute in larger channels.

Rheology for PSAP Plus MF Combinations

Some PSAP materials are not ideally viscoelastic. In fact, some surface crosslinked or highly bulk crosslinked PSAP alone at 1% concentration by weight in water gives a nearly-Newtonian behavior with a viscosity of about 500 cP or milli-Pa-s. In contrast, a composition containing 1% of such PSAP and 0.3% to 0.5% Exilva Forte (MFC) becomes shear thinning (thixotropic) and pseudo-plastic. The viscosity of the above composition increases by factor of 6 up to about 3000 mPa-s at low RPM or low shear rate (1 s-1). This rheology closely resembles the rheology of another formulation that has been used in certain experiments, namely a formulation containing 1% Exilva Forte+2% SMCC 50 without containing any SAP. The resulting structure may resemble a 3D network complex fluid which exhibits a yield stress and behaves with viscoelastic properties where G' is several times larger than G" as described further in U.S. Ser. No. 62/828,134 filed Apr. 2, 2019 (NOVA004P4).

It is believed that the presence of minute fibrils such as MFC improves the stability (i.e., the ability to resist separating even after being stationary for a long period of time) of a formulation that includes SAP. In many cases a composition comprising a combination of SAP and MFC has higher yield shear stress. The concentration of SAP and MFC can be varied to control the viscoelastic properties of the compositions such as G' and G", as is known in the rheology of complex fluids. Both yield stress and G' (storage modulus) are important to making formulations that more efficiently remove BBF and other similar contaminants, including protein and patient materials.

The small and large fibrils of MF appears to help to keep the SAP particles separated from each other may be viewed as a protective layer and it is known in colloid science as "steric stabilization." The nature and thickness of the protective layer can be tailored by selecting the MFC or other fibrillated materials, their degree of fibrillation, dimensions of fibers and fibrils, and concentration. Thus, the pragmatically measured coalescence, measured in the context of the cleaning composition, can be less with MF present, even if the SAP has a larger tendency to coalesce than might otherwise be desired.

It is believed that during flow of the above compositions through a channel, the SAP particles, because of their elastic properties, may help in pressing the whole network against the channel wall (imposing a normal force onto the wall). This may enhance the cleaning action due to the better contact of the Minute Fibrils (and solid particles if present) with contaminants present at the channel wall. The swollen SAP particles can effectively increase the elastic components (G') of the this complex viscoelastic material/fluid. Additionally, the SAP particles themselves appear to have another specific cleaning action due to an apparent direct interaction with contaminants at the channel wall. The latter interaction may be more effective in removing highly adhering contaminants such as biofilms, although Applicant does not not wish to be limited to this theory.

Other Considerations for MF/PSAP Combinations

It is furthermore believed that (as compared to earlier formulations having no SAP while having higher concentrations of minute fibrils) smaller concentrations of MF can be used, and it is further believed that lower MF concentrations reduce the probability of clogs occurring during flow in narrow, possibly bifurcating, channels. It is further believed that using SAP that is appropriately crosslinked to minimize coalescence (gelling) further reduces the risk of clogging. Also, it is believed that the presence of PSAP can increase the efficiency of rinsing after use of the cleaning composition (whether MF/PSAP or PSAP alone).

With all combinations of the invention, kits may be sold with two types of compositions. One for tubing with a high risk of clogging, and another where the clogging risk is lower.

Minute Fibrils

Figure 2:
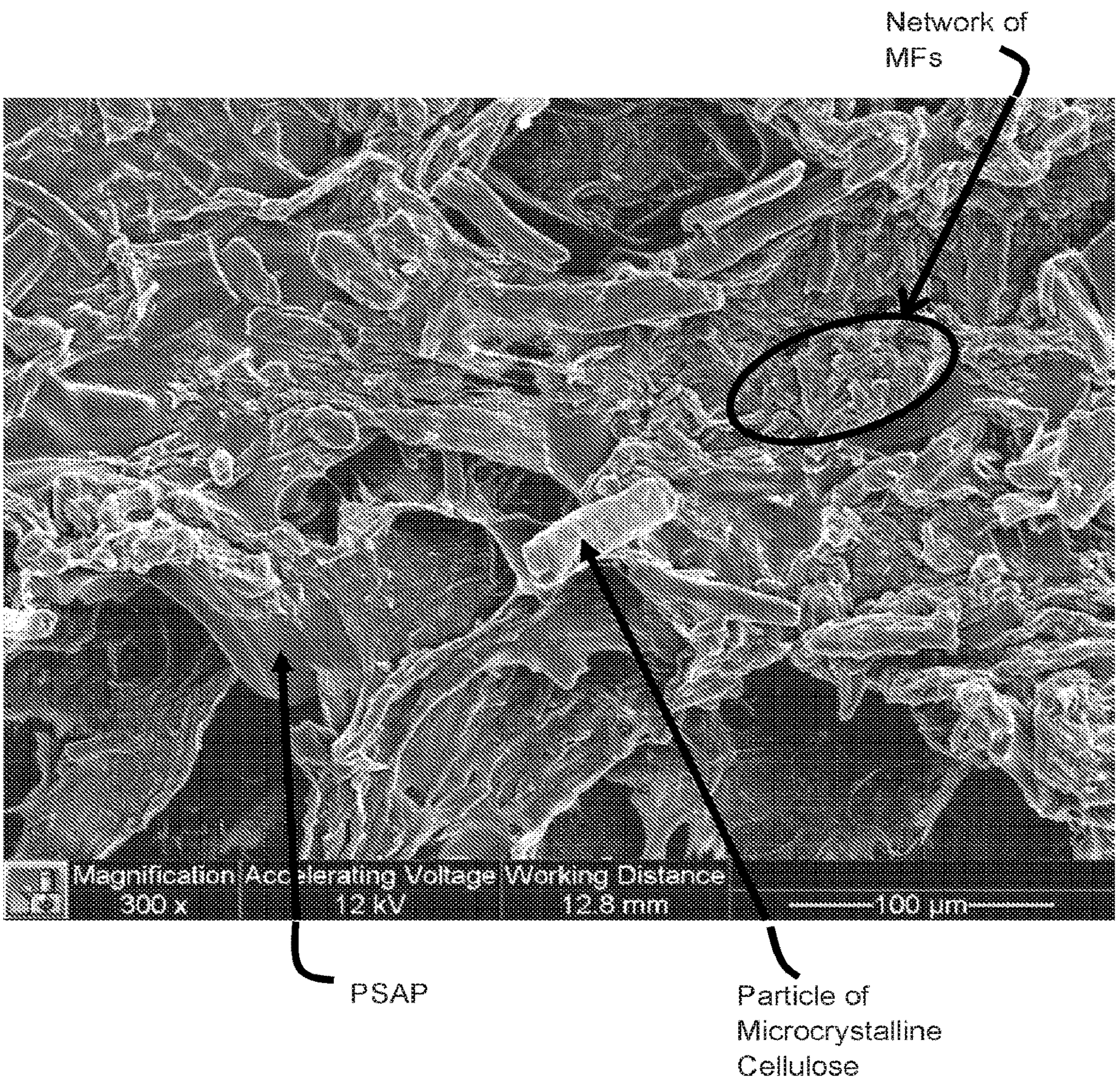
FIG. 2 is an SEM image of a composition of PSAP, MF and solid particles.

"Minute Fibrils" (MFs) is a term coined to encompass what the industry terms as microfibrillated cellulose and nanofibrillated cellulose (which are basically the same thing) and substantially equivalent structures made from synthetic polymers, including without limitation those made by the Lyocell melt spinning process or similar processes. The structure of cellulose is illustrated in FIG. 2 of WO2018064284A1 (adapted from nutrition.jbpub.com/resources/chemistryreview9.cfm). The structure of microfibrillated cellulose can be discussed with reference to this figure. In native cellulose structures there are native cellulose fibers (diameter=about 20,000 nm to about 60,000 nm), smaller macro fibril bundles and still smaller micro fibril bundles. There are believed also to be single polymer chains (which do not visualize as easily in microscopy). Microfibrillated cellulose is cellulose that has typically been treated mechanically, chemically, enzymatically, or with combination treatments to separate out macro fibril bundles and micro fibril bundles. These can loop off larger fibril bundles, or extend from larger fibril bundles. It may be that there are unconnected micro fibril bundles, but the amounts are believed to be small, and the fibril bundles are believed to associate with the connected fibril bundles. There can be two or more tiers of diameter sizes. What is important is that the micro fibril bundles (or their analog) are connected to stiffer, larger bundles.

In embodiments, the Minute Fibrils comprise thicker fibrils, from which branch thinner fibrils, the thicker fibrils having a diameter from about 250 to about 20,000 nm. In embodiments, the thinner fibrils contribute to the entangled network structure. The thinner fibrils can include for example fibrils of diameter of about 10 to about 90 nm.

A useful measurement parameter for Minute Fibrils is the hydrodynamic size (HDS), especially the mean EDS (MHDS). This is measured by laser diffraction of a highly dilute suspension, using a Mastersizer 3000 (Malvern Instruments), [Jose et al., On the morphology of cellulose nanofibrils obtained by TEMPO-mediated oxidation and mechanical treatment, Micron, 72, 28-33 (2015)]. Though energy is applied (by sonication) to separate structures, it is not clear whether the entity measured is a single structure, or a floc of two or more. The substance so measured is a "fibrillated entity."

It has been found that microfibrillated cellulose that has been processed to the extent that the MHDS is as low as about 20 micron (micrometer) is less effective, if provided on its own, than microfibrillated cellulose with MHDS of for example 30 to 70 micron. Surprisingly the larger microfibrillated cellulose is in some embodiments even more effective if appropriately mixed with smaller microfibrillated cellulose. These and all other lessons drawn from cellulose are expected to be applicable to synthetic Minute Fibrils as well. Thus, in embodiments, it is useful to mix a Minute Fibril composition having one MHDS with one having a MHDS of 50% or less than that of the other. In embodiments, a ratio having more of the larger Minute Fibril component (by dry weight) is used, such as a ratio of about 1.5:1 or more, such as about 2:1 or more, or about 3:1. In embodiments, the distribution of the source compositions is tight enough such that the mixture is indicated in the product by a bimodal (or for further mixtures, multi-modal) distribution.

For cleaning, typically, an entangled "fibrillated network" is used. A fibrillated network is a 3-D network structure made from the interaction of fibrillated entities as the result of entanglements of fibrils as well as due to hydrogen bonding (or other non-covalent bonding mechanisms including electrostatic) when the fibrillated materials are properly mixed with water or solvents. Entanglement can be tested for by optical microscopy and by ensuring that the composition show some yield shear stress (such as more than 1 Pa, or more than 10 Pa or even up to 100 Pa) as per rheological testing as is known the art. This entanglement is believed to be useful for achieving effective cleaning and for ensuring complete rinsing without leaving residues on the surface. Minute Fibrils of the invention can form 3-D network at small weight percent, such as 0.3 or 0.4% wt/wt (in the absence of other polymers).

Without being bound by theory, it is believed that when a suspension, dispersion, network or mixture of Minute Fibrils flows in channel or the like, the fibers, fibrils or their flocs (aggregates that move and tumble as a unit) or their nanostructures as described herein contact or nearly contact the surface of the channel or tube during flow, resulting in scraping, abrading, removing, detaching, desorbing or effecting localized brushing-like action at a very small size scale. These cleaning processes occur when the gel-like network structure such as Minute Fibrils moves past the wall while the gel structure such as Minute Fibrils are in contact or nearly in contact with the wall. This action is believed to repeatedly create localized high hydrodynamic detachment force or even make direct contact with the surface being cleaned, with that force or stress being sufficient to detach, desorb and remove contaminants.

The very large specific surface area of the Minute Fibrils can significantly facilitate material transfer and removal of contaminants from the walls of channels, tubes or confined space during flow. The specific surface area of for example some nano- or microfibrillated cellulose material (as determined by the BET (Brunauer-Emmett-Teller) method) can be more than about 10 m^2/g and up to more than 300 m^2/g or 500 m^2/g and in some cases can be more than one or two billion m^2/g, which can produce effective and efficient treatment and can clean walls as they contact or nearly contact them during flow. The large surface area can facilitate adsorption of contaminants and can trap contaminant fragments during cleaning. The surface area can be estimated from SEM micrographs, adsorption of nitrogen or other gas, surfactant or other molecular probe with known surface area or combination of methods as it is known in the colloid and surface science or materials science literature.

For the purposes of the claims, measurement is by the adsorption of nitrogen onto the surface of the material. This technique is based on the Brunauer-Emmett-Teller (BET) theory of the adsorption of gas molecules on a solid surface. In this technique, the material is prepared by first desorbing whatever is adsorbed onto the surface of the material, and then the material is placed in an environment where it can adsorb nitrogen. The amount of gas adsorbed at a given pressure indicates the specific surface area of the material. This measurement of the amount of the amount of adsorbed gas can be made by measuring the change in the amount of gas present, or by measuring the change in the weight of the material.

In certain embodiments, the specific surface area for the Minute Fibril composition providing the major portion (50% or more) of Minute Fibrils is about 30 m^2/g to about 300 m^2/g, or higher in some cases.

Cellulosic Minute Fibrils—Production

Methods of production of Minute Fibrils include mechanical processing, TEMPO-catalyzed processing, and enzymatic processes, and combinations of thereof. Exilva grade microfibrillated cellulose (made by Borregaard) is made by a purely mechanical process with many passes through Borregaard's processor machine, which includes a form of microfluidizer. The Lyocell process, which can be used with cellulose, is similar to what is used in making Nylon and it can also be used with acrylics or other polymers. TEMPO (a common name for a catalyst whose chemical name is (2,2,6,6-Tetramethylpiperidin-1-yl)oxyl or (2,2,6,6-tetramethylpiperidin-1-yl)oxidanyl) is used in some processes to induce partial cleavage in the cellulose. Sodium hypochlorite or sodium bromide can also be used as oxidizing agents (for example along with TEMPO) for cleavage, in combination with mechanical force. A variety of mechanical processes can be used such as high pressure homogenization, microfluidization, grinding, refinery-based processes, cryocrushing, and high intensity ultrasonication. It can include directing jets of fiber-containing liquid to impinge on one another. A process may use for example, two passes through a grinder or refiner, and multiple passes through a homogenizer.

Materials made by Borregaard have subclassifications including:

TABLE 1A

| Sub-Grade | Mean Hydrodynamic size | Size Range |
|---|---|---|
| Exilva Forte | ~20 micron | ~1 to ~1000 micron |
| Exilva Piano (various grades) | ~36 to ~60 micron | ~1 to ~1000 micron |
| Exilva Piano Light | ~70 micron | ~1 to ~1000 micron |
| Sensifi (in admixture with CMC) | ~100 micron | ~1 to ~1000 micron |

A number of further MF materials useful in the invention are set forth in Provisional patent application U.S. Ser. No. 62/828,134 filed Apr. 2, 2019 (NOVA004P4), at p. 114.

As analyzed by numerous SEMs at several magnifications, some illustrative cellulosic Minute Fibrils have the following features:

TABLE 2

| Microfibrillated | Fibers (Larger) | | Fibrils (Smaller) | |
|---|---|---|---|---|
| Cellulose | Diameter | Length | Diameter | Length |
| Exilva Forte | 0.5-3 μm | 10-100 μm | 30-60 nm | >2 μm |
| Exilva Piano | 0.1-20 μm | 5-150 μm | 50-70 nm | 2-3 μm |
| Exilva Piano Light | 0.3-20 μm | 20-200 μm | 20-75 nm | 1-5 μm |
| Sensefi | 0.25-15 μm | 5-60 μm | 30-60 nm | 0.4-1.0 μm |

The results of Table 2 include a summary of the SEM analysis of some of the fibrillated materials as described in embodiments of the invention. The top three materials listed in the Table represent different degrees of fibrillation and are sold without other additives. The fourth material (Sensefi) is made by a special process and as sold includes carboxymethyl cellulose (CMC). The fibrillated material, made as dilute suspension, was deposited to SEM stubs and coated according to accepted SEM imaging methods. The data is divided based on manual image analysis where fibers and fibrils are listed separately. Diameter and length of fibers and fibrils are includes as seen in the micrographs. The ranges of diameter and length of fibers and fibrils include the most prevalent sizes. At least 1000 fibers and 1000 fibrils were examined for each of the four materials. Diameters can be highly accurate since they can be obtained from the micrographs. On the other hand, the lengths can be less precise since it difficult to ascertain because of high magnification of the SEM images. The SEMs for each material was obtained at 100×, 1,000×, 2,000×, 10,000×, 50,000× and 10,0000×. In an embodiment of the invention, the diameter and length of the fibers and fibrils represent the ranges used to prepare the networks described in the specification. This can be important since the diameter and length are believed to contribute to the mechanical properties of the network, especially strength, stiffens and rigidity which are important for cleaning according to the invention. Although SEMs provide specific data about the morphology of the fibrillated materials, other definitions of the fibrillated materials can be obtained from laser scattering results of the equivalent hydrodynamic volume as described elsewhere herein. Additional description of the fibrillated materials includes viscosity data and rheological date when suspended in liquid as described elsewhere herein.

Microfibrillated fibrous materials are now commercially available from such suppliers as: Borregaard (Sarpsborg, Norway) (products include Exilva, Sensefi); Weidmann Fiber Technology (Rapperswil SG, Switzerland) (WMFC QAdvanced); Engineered Fibers Technology LLC (Shelton, CT) (EFTec™ nanofibrillated fibers); American Process, Inc. (Atlanta, GA) (BioPlus® Fibrils); Celluforce (Montreal, Canada); Forest Products Laboratory (US Department of Agriculture); Lenzig AG (Austria)(products include Lyocell); Weyerhaeuser (Seattle, WA)(products include Lyocell); and other suppliers in Scandinavia and Japan.

Synthetic Minute Fibrils—Production

Synthetic polymers can be formed into macro fibril structures for example by spinning (extruding) a solubilized formulation. For example, cellulosic polymers can be so extruded, for example using N-methyl-morpholin-N-oxide (NMMO) as the solubilizing solvent. Other solvents can be chosen as appropriate for solubilizing the polymer in question, such as acrylics and others. The spun fiber can then be cut and mechanically converted into a Minute Fibril form as outlined above. For example, Engineered Fibers Technology (Shelton, C) sells fibrillated polymers of Acrylic (CFF®, acrylic copolymer), Lyocell (Tencel®, for wood pulp), LCP (Vectran®, aromatic polyester), PBO (Zylon®, crystalline polyoxazole), Para-aramid and Cellulose (wood and nonwood).

Synthetic and cellulosic MF can be made by the well-known Lyocell process.

Solid Particles

Additional components can be added to provide a stiff network, which can be useful to supplement the effects of the stiff components of Minute Fibrils, add stiff components to PSAPs, or provide abrasives to Minute Fibrils, PSAPs or gels. Non-polymer abrasives or solids can also be added. The manner in which these components are added can have a notable effect. Without being bound by theory, if introduced with high energy, they are anticipated to uniformly distribute. If added with less energy, e.g., whisking, they are anticipated to more strongly populate the outer parts of flocs of Minute Fibrils. In certain embodiments, such as for example cleaning optical lenses, extra care may be taken with the selection these components to avoid damage. In certain embodiments, such as cleaning or sharpening blades, the selection of these components may be made to accentuate microabrasion. Such Solid particles can impart functions that increase G' of the cleaning composition.

Solid Particles Such as Polymers; Friction Elements or Stiffening Elements

Solid polymers are exemplified by MCC or SMCC, though other polymers that can provide this function can be substituted. MCC is available in various grades from several sources and vendors, and can be obtained from FMC Corporation, Newark, DE, under the name Avicel®. Microcrystalline Cellulose is made by a hydrolysis process which removes the amorphous fraction from cellulose fibers and controls the degree of polymerization at the same time. In embodiments, MCC fibers are not as elongated (as described by length/diameter ratio) as some of the Minute Fibrils described herein. Microcrystalline Cellulose is safe and is used extensively to make tablets and other pharmaceutical and food products. Another version of MicroCrystalline Cellulose is SMCC.

Microcrystalline Cellulose can form gels that have increased viscosity when standing, especially when the Microcrystalline Cellulose is co-processed with carboxymethyl cellulose (CMC) polymer. Because of its elongated shape and stiff crystalline nature, Microcrystalline Cellulose does not readily form gels that have entangled network structures; however, it can make some kind of 3D network that forms weak gels over one or more weeks. Accordingly, gels based on MCC-CMC may be weaker (in terms of yield shear stress) compared to gels made from Minute Fibrils.

Because of its crystalline nature, MCC can provide rigidity, stiffness and hardness to the Minute fibril compositions described herein. In addition, when MCC is included as a component of the Minute Fibril network at sufficient concentration, from about 0.1 to 10% by weight and preferably at about 1 to 3% by weight of the cleaning composition, it can provide a stronger network (or increase yield shear stress and storage modulus) and abrading action at the wall or surface to remove strong contaminants such as for example build up biofilm.

If added with high energy, the effect of MCC on improving BBF cleaning is less than if added to a Minute Fibril network with lower energy.

Cellulosic particles appear to be more effective if derived from a harder wood.

Nonpolymer Solid Particles

In yet another embodiment of the invention, the composition may comprise Minute Fibrils or PSAP and also nonpolymer solid particles. In embodiments, the hardness of fluid cleaning compositions can be increased by including nonpolymer solid particles at suitable concentration from 0.1 to 5% and preferably from 0.2 to 3% by weight of the cleaning composition. Accordingly, compositions including solid particles or fibers are effective in removing biofilms and contaminants from passageways and surfaces.

Hardness can be described, at least qualitatively, using the Mohs hardness scale that was originally developed in the field of mineralogy, or another scale. It is believed that the hardness of cellulose is about 3 on the Mohs hardness scale. As an example, the particles may be simple inorganic substances, which may be insoluble or poorly-soluble in water. For example, Calcium Carbonate (CaCO3) is one such substance. Calcium carbonate is believed to have a Mohs hardness of around 4. Colloidal silica (silica gel) is another possible substance. Colloidal silica is not as hard as ordinary silica or quartz. The Mohs hardness of silica gel is around 4, similar to that of CaCO3. Silica gel is amorphous and is not very scratchy. Ordinary silica or quartz, in contrast to colloidal silica, is hard enough to remove biofilm, but also is hard enough to scratch typical polymeric materials used for the wall of the passageway. Quartz, which is ordinary silica, like sand, has a Mohs hardness of 7. Silica gel is FDA approved for use as a dentifrice also is approved for exfoliating, and it does not cause silicosis.

Another suitable particle material of the inventive composition could include crushed olive pits and crushed cashew nut, both of which are available commercially in a range of particle size from 50 microns to more than 500 microns. Such material can be mixed in with other components of the Minute Fibril composition. Particles or fibers used can include: Wool made by Goonvean, Nylon made by Goonvean, Olive Stone made by Goonvean, Syloid EXF150 (SiO2) made by W.R. Grace, FMC Lattice NTC-80 Microcrystalline Cellulose, FMC Lattice NTC-61 Microcrystalline Cellulose, FMC NT-100, FMC NT-200, Precipitated CaCO3, and the like.

Insoluble or poorly-soluble material can also be formed within the composition by a precipitation reaction that could take place upon the mixing of appropriate aqueous-solution ingredients. Examples include but not are limited to precipitated calcium carbonate, silica, calcium phosphates including hydroxyapatite, fluorophosphates, alumina and other materials. The particles formed within the network can be crystalline, amorphous or comprising mixed phases as desired. The particle size and size distribution of particles formed within the network can for example range from 50 nanometers to several microns possibly in the range from 0.5 to 100 microns, or even up to 500 microns or more. For example, a reaction that produces insoluble calcium carbonate particles within the network includes mixing calcium chloride and sodium carbonate which can be formed in situ within the Minute Fibril network during preparation. Other reactions include: reaction between various carbonates (e.g. sodium carbonate) and calcium hydroxide; reaction of soluble calcium salt and carbon dioxide gas; reaction between ammonium carbonate and calcium hydroxide or other reactions known to form calcium carbonate as is known in inorganic chemistry. The sizes of such produced precipitate particles can be dependent upon the rate and other conditions at which the reaction takes place. Scanning Electron Microscope examination has shown that precipitated calcium carbonate is distributed onto the fibers and fibers and on the spaces between them within a Minute Fibril network. Precipitated particles that adhere to fibril surfaces are especially useful as they can modify the stiffness and hardness of the network and can thus improve the abrasion properties of the network. Composition comprising in situ precipitated particle were found to be effective in removing strong build up biofilms.

Further examples of solid particles are provided in Table 3.

TABLE 3

| Product | Source |
|---|---|
| Wool CMW80; Dia.: 20-30 μm (>90%); Length: Max: 200 μm (>95%) | Goonvean Fibres (goonveanfibres. com) |
| Nylon (Polyamide) Fibre WN60; Dia.: 10-20 μm ± 10% (>95%); Length: Max: 250 μm (>90%)(Average (>50%): ~125-250 μm | Goonvean Fibres |
| Viscose Fibre RM60; Dia.: 8-25 μm ± 10% (>95%); Length: Max: 250 μm (>95%)(Average (>50%): ~100-225 μm | Goonvean Fibres |
| Olive Stone Grit EFOG; Max: 355 μm (>99%); Passing: 200 μm (<15%); Passing: 150 μm (<4%) | Goonvean Fibres |
| Silica Syloid EXF 150 (150 μm) | W.R. Grace Co., Columbia, MD |
| Silica Syloid EXF 350 (350 μm) | W.R. Grace Co. |
| Silica Syloid EXF 500 (500 μm | W.R. Grace Co. |
| Hydrocarb 60-FL 78% 3996200 | Omya Inc., Cincinnati, OH |
| Hydrocarb PG3-FL 73% | Omya Inc |
| Omya Syncarb S160-HV 20% 4430400 | Omya Inc |
| Omya Syncarb S240-HV 20% | Omya Inc |
| Silica Gel, 200-425 mesh | Sigma-Aldrich, Inc., St. Louis, MO |
| Silica Gel, 28-200 mesh | Sigma-Aldrich, Inc. |
| Calcium Carbonate | Sigma-Aldrich, Inc. |

Functional Parameters for PSAP and/or MF with Solid Particles

Cleaning compositions based on PSAP or MF appear to generally function better against strongly adhering contaminants if the compositions contain added solid particles. Such solid particles appear to provide friction, abrasion, erosion, fragmentation or their combination to achieve often superior removal of BBF from a channel wall.

Exemplary PSAP, MF and MCC Structure

FIG. 2 shows an SEM micrograph of a composition containing PSAP, MF and MCC. The shows the appearance of the ingredients in a dry condition after the ingredients were mixed together in a wet condition and then were dried out. The image reflects some shrinkage of the PSAP from the drying process. Drying was required because the of the need for vacuum in Scanning Electron Microscope. Provisional patent application U.S. Ser. No. 62/828,134 filed Apr. 2, 2019 (NOVA004P4) contains more such images of like compositions.

Figure 3:
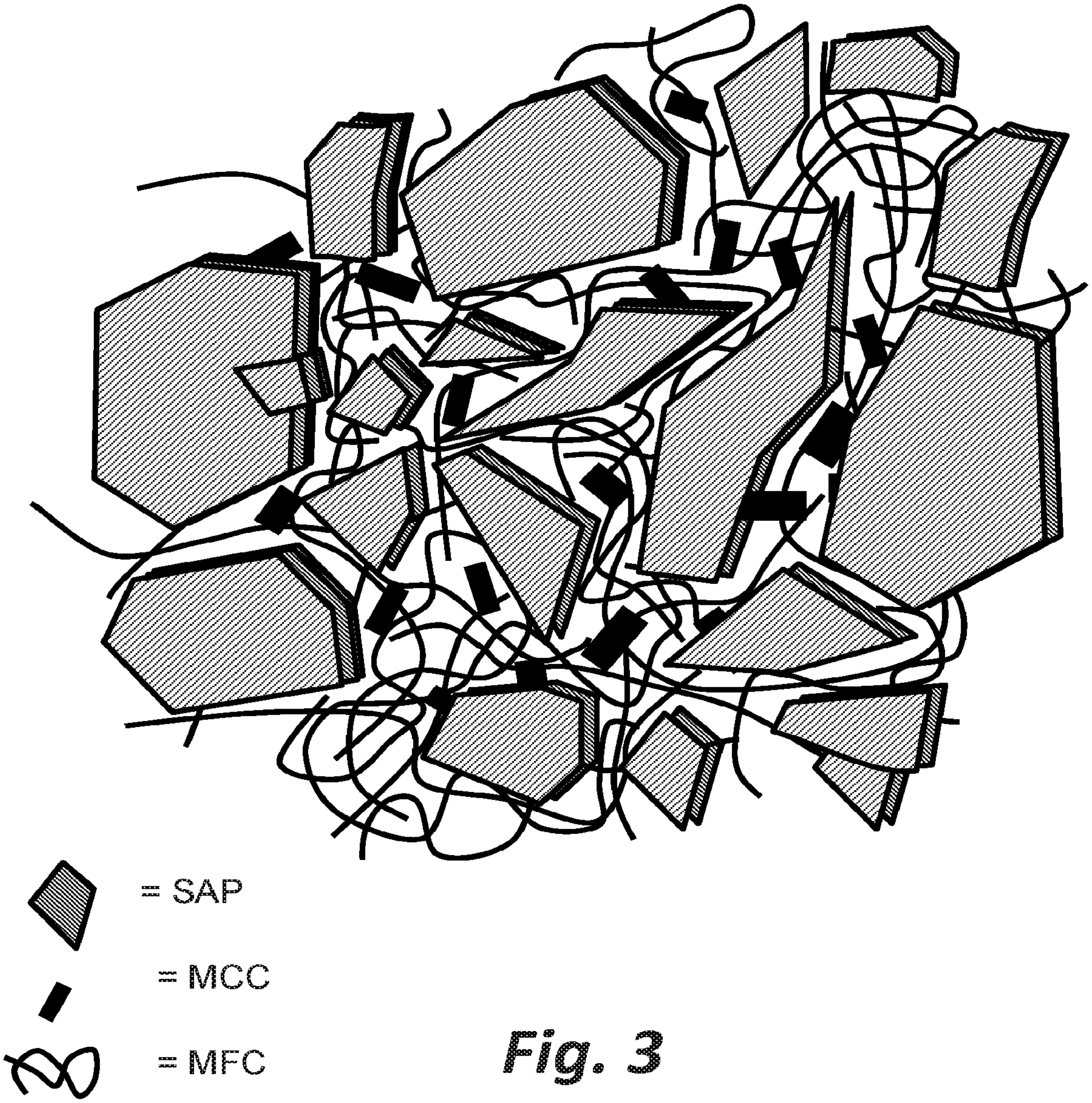
FIG. 3 is a schematic of a mosaic of PSAP, MF and solid particles.

FIG. 3 shows a schematic of what is believed to be a representative structure of compositions of embodiments of the invention. The somewhat large irregular shapes are representations of PSAP. The smaller rod-like shapes are representations of MCC. The curved lines are representations of MF's. Many of the MFs are between other particles but also in this view some of the Minute Fibrils overlap or overlie particles (PSAP or of MCC). This schematic representation can be referred to as a "mosaic."

If one looks at a magnified image (from a SEM image) of the composition, it can be seen that the spaces between SAP particles contain MFC or in other words such spaces are filled with fibrillated material. The visible microstructure of the composition may also be that MFC coats the surface of SAP particles. The above two microstructures can be present together and their ratio may depend on the ratio of SAP-to-MFC in the composition. It appears that the SAP particles may lie flat on the surface of a channel and can occupy a large fraction of the surface to be cleaned. It is believed that the SAP particles themselves don't entangle with each other, but may join together in some other fashion such as by forming gel bridges between each other, and in this sense they form secondary network. In some SEM images, the SAPs appear to form gels by merging with each other. The fraction of merging into gels may be 10 to 50% but can be more than 20% based on microscopic examination. The SEM images show that SAP and fibrillated materials can merge together. There is evidence based on SEM that some fibrils become incorporated in the SAP gel materials. As mentioned above, the test for too much coalescence is with respect to retaining good flow.

Cleaning Effective Measurements

A composition has a protein cleaning effective amount of fibrils plus any gel-forming polymer or any stiffening components if that amount, formulated at one or more of pH 7 or 9 in CS-19 (described in ¶0104 and Table 4 of WO2018064284A1) would clean Austrian Soil-derived protein (applied as described below in ¶¶0194-97 of WO2018064284A1) from the inner surface of a six foot length of 3.2 mm ID PTFE tubing to reduce adherent protein by 50-fold or more to a level of about 6.4 μg/cm2 or less.

A composition has a protein cleaning effective amount of PSAP plus any any further gel-forming polymer or any stiffening components if that amount, formulated at one or more of pH 7 or 9 in CS-19 (described in ¶0104 and Table 4 of WO2018064284A1) would clean Austrian Soil-derived protein (applied as described below in ¶¶10194-97 of WO2018064284A1) from the inner surface of a six foot length of 3.2 mm ID PTFE tubing to reduce adherent protein by 50-fold or more to a level of about 6.4 μg/cm2 or less.

A BBF cleaning effective amount of fibrils plus any gel-forming polymer or any stiffening components is one that if that amount, formulated at one or more of pH 7 or 9 in CS-19, would remove BBF (formed as described ¶0061 and Example 2 of WO2018064284A1) from the inner surface of a six foot length of 3.2 mm ID PTFE tubing as measured by SEM analysis.

A BBF cleaning effective amount of PSAP plus any additional gel-forming polymer or any stiffening components is one that if that amount, formulated at one or more of pH 7 or 9 in CS-19, would remove BBF (formed as described ¶0061 and Example 2 of WO2018064284A1) from the inner surface of a six foot length of 3.2 mm ID PTFE tubing as measured by SEM analysis.

A composition (for any gel, fiber or other cleaning embodiment) is protein cleaning effective if it cleans Austrian Soil-derived protein (described in ¶0104 and Table 4 of WO2018064284A1) from the inner surface of a six foot length of 3.2 mm ID PTFE tubing to reduce adherent protein by 50-fold or more to a level of about 6.4 μg/cm2 or less.

A composition (for any PSAP, gel, fiber or other cleaning embodiment) is BBF cleaning effective if it removes 90% or more of BBF from the inner surface of a six foot length of 3.2 mm ID PTFE tubing as measured by SEM analysis.

A TBF cleaning effective amount of fibrils plus any gel-forming polymer or any stiffening components is one that if that amount, formulated at one or more of pH 7 or 9 in CS-19, would remove TBF (formed as described Example 1 of WO2018064284A1) from the inner surface of a six foot length of 3.2 mm ID PTFE tubing as measured by SEM analysis. (TBF is essentially BBF but without chemical crosslinking.)

A TBF cleaning effective amount of PSAP plus any additional gel-forming polymer or any stiffening components is one that if that amount, formulated at one or more of pH 7 or 9 in CS-19, would remove TBF (formed as described Example 1 of WO2018064284A1) from the inner surface of a six foot length of 3.2 mm ID PTFE tubing as measured by SEM analysis.

A composition (for any PSAP, gel, fiber or other cleaning embodiment) is TBF cleaning effective if it removes 90% or more of BBF from the inner surface of a six foot length of 3.2 mm ID PTFE tubing as measured by SEM analysis.

For formulations configured for open surfaces and having too much viscosity for measuring protein or BBF removal in a tube, if formulations included within the components are protein cleaning or BFF cleaning, the formulation is so effective.

In each of the above measurements, in the 6-ft length of 3.2 mm tubing, with respect to a 5 cm segment sampled from the middle of the tubing, and at a flow rate of 5 mL/min, preferably the contaminant is removed in a short period of flow through the segment of less than 12 minutes, or in less than 6 minutes, or less than 3 minutes, or less than 1 minute.

Core Component Ranges

Cleaning Composition with PSAP but not MF

Useful concentrations of PSAP can include for example from about 0.1% w/w to about 2% w/w.

In embodiments, PSAP is about 1 to 2% wt/wt. In embodiments, solid particles are about 0.4 to about 1.0 or about 1.2% wt/wt. In embodiments, surfactant is nonionic, and present in an amount from about 0.1% to about 1% wt/wt. In embodiments, EDTA is present. In embodiments, propylene glycol is present. In embodiments, pH is from about 7.5 to about 11.

Cleaning Composition with PSAP and MF

Useful concentrations of Minute Fibrils can include for example from about 0.2% w/w to about 4% w/w, or from 0.2% w/w to about 1% w/w, with useful concentrations of PSAP including for example from about 0.2% w/w to about 1.2% w/w, or from about 0.4% w/w to about 1% w/w. Factors for selection of MF are as described above.

It is believed that the presence of PSAP allows for lower amounts of MF (while MF can still provide the scaffold for entanglement), which can provide the added benefit of reducing the risk of clogging. The deformability of PSAP is also believed to be beneficial to avoiding clogging.

Cleaning Composition with PSAP and MF and Solid Particles

Useful concentrations of SAP can include for example about 0.5% wt/wt to about 2% wt/wt, with useful concentrations of MF for example from about 0.2% wt/wt to about 1% wt/wt, and with useful concentrations of solid particles for example from about 0.3 wt/wt to about 1% wt/wt. A useful pH is from about 8.5 to about 11.

Carrier Fluid Components

The gel or Minute Fibrils (or both) are suspended in a carrier fluid, such as without limitation an aqueous fluid. Typically, there will be a surfactant component configured to help loosen the attachment of a contaminant to a surface.

Surfactants or Dispersants

In embodiments of the invention, the fluid composition can comprise a surfactant or a surfactant package or mixture containing one or more surfactants. During for example preliminary cleanup of a medical device (the bedside prep phase), surfactants can prevent and decrease strong adhesion of patient's biological material such as fecal matter, blood, mucus, protein and organisms that has recently contacted the surface of an endoscope or device, and also can help to prevent drying of such material onto surfaces. Surfactants can also promote wetting of hydrophobic surfaces and prevent de-wetting of surfaces by promoting formation of a thin film on the surface if drainage of composition would take place. Surfactants also can help in the removal of such materials (organic soils, biofilms, organism and patient materials such as fecal matter) from the surfaces and can lower the adhesion force of contaminants with the surface. A surfactant package (which can be a combination of more than one surfactant) can use a nonionic surfactant, or can use an anionic or cationic surfactant or an amphoteric surfactant or a mixture comprising various different surfactants. Examples of surfactants that can be used include sodium dodecyl sulfate; alkyl ethoxylates; amine oxides; amphoteric betaines; alkyl sulfonates; alkyl phenosulfonates; fluorosurfactants; and the like. Sodium dodecyl sulfate (SDS), which is an anionic surfactant, is known to penetrate and help dislodge biofilm. Other surfactants can be used to make the compositions of invention without limitation as provided for example in Milton J. Rosen Monograph "Surfactants and interfacial phenomena", third edition, Wiley Interscience (2004), and in "Surfactants—A Practical Handbook", Edited by K. Robert Lange, Hanser Publisher, Munich (1999).

Suitable anionic surfactants include fatty acid soaps covering a range of alkyl chain length, for example up to about 18 carbon atoms, and may be straight or branched chain alkyl groups. These surfactants are normally used at a pH higher than the dissociation constant of their corresponding carboxylic acid. Another class of anionic surfactants that has been found to be effective with the present method is alkyl sulfates and sulfonates, such as SDS. Another useful anionic surfactant may be based on alkylpolyoxyethylene sulfate. Another anionic surfactant that can be used is an alkylbenzene sulfonate. Linear and branched chain alkylbenzene sulfates with one or more sulfonate groups have been found to be useful. Suitable anionic surfactants also include alpha-olefin sulfonates, monoalkyl phosphates, acyl isothionates, acyl glutamates, N-acyl sarcosinates and alkenyl succinates and the like that have an anionic surface group and possess surface activity.

Suitable amphoteric surfactants include for example alkyldimethylamine oxides, alkylcarboxy betaines, alkylsulfobetaines, amide-amino acid type amphoterics and others that may exhibit amphoteric and surface activity. Amphoteric substances have characteristics of both acid and alkali groups.

Useful nonionic surfactants include for example polyoxyethylene alkyl ethers, polyethylene alkylphenyl ethers, polyethylene fatty acid esters, sorbitan fatty acid esters, polyethylene sorbitan fatty acid esters, sugar esters of fatty acids, alkyl polyglycosides, fatty acid diethanolamides, fatty acid monoglycerides, alkylmonoglyceral ethers, fatty acid polypropyleneglycol esters and the like.

Useful cationic surfactants include for example alkyltrimethylammonium salts and their phosphonium analogues, dialkyldimethyl ammonium salts, alkylammonium salts, alkylbenzyldimethylammonium salts, alkylpyridinium salts and the like which bear cationic functional groups and possess some surface activity.

Polymeric dispersants can also be used. Although they do not have the molecular structure of a typical surfactant, they have similar effects. These include formaldehyde condensates of naphthalene sulfonate, sodium acrylates or copolymers of other acrylic acids, copolymers of olefins and sodium maleate, lignin sulfonates, polyphosphates, silicates and polysilicates, carboxymethyl cellulose, cationic cellulose, cationic starches, polyvinyl alcohol, polyethylene glycol, polyacrylamides, polyethylene oxide/polypropylene oxide block copolymers (e.g., di- and tri-block), and the like. These compositions are also useful herein to function substantially as surfactants. There are also detergent substances which are not strictly surfactants. Examples include trisodium phosphate, sodium carbonate and polymers. Such substances can also be used with the present invention.

Solvents, Cosolvents

The carrier fluid or vehicle for the gel or Minute Fibrils, such as an aqueous carrier fluid, can comprise an organic solvent and optionally can further include a co-solvent. A co-solvent is a second solvent added in a smaller quantity than the primary solvent to enhance the dissolving ability of the primary organic solvent. The solvent and optionally the co-solvent can help to remove substances such as protein or organic soil. Organic soil can be protein, lipids, carbohydrate, hemoglobin or similar substances. The solvent and the optional co-solvent can be for example propylene glycol or a glycol ether. Solvents such as propylene glycol and glycols ethers (from e.g., DOW Chemical Company) and others can be useful in the compositions of the invention because they contribute to achieving high-level removal of lipids and some proteins from endoscope channels and from external surfaces of medical or industrial devices.

The term propylene glycol is intended to refer to any enantiomer or isomer of propylene glycol, either alone or in combination. This includes α-propylene glycol (propane-1,2-diol) and β-propylene glycol (propane-1,3-diol). Propylene glycol is highly miscible with water and also is able to dissolve various organic substances.

Glycol ethers are a group of solvents (often termed "cleaners") based on alkyl ethers of ethylene glycol or propylene glycol. Most glycol ethers are water-soluble. They are also able to dissolve various organic substances. As non-limiting examples, glycol ethers include at least the following substances: Ethylene glycol monomethyl ether (2-methoxyethanol, CH3OCH2CH2OH); Ethylene glycol monoethyl ether (2-ethoxyethanol, CH3CH2OCH2CH2OH); Ethylene glycol monopropyl ether (2-propoxyethanol, CH3CH2CH2OCH2CH2OH); Ethylene glycol monoisopropyl ether (2-isopropoxyethanol, (CH3)2CHOCH2CH2OH); Ethylene glycol monobutyl ether (2-butoxyethanol, CH3CH2CH2CH2OCH2CH2OH); Ethylene glycol monophenyl ether (2-phenoxyethanol, C6H5OCH2CH2OH); Ethylene glycol monobenzyl ether (2-benzyloxyethanol, C6H5CH2OCH2CH2OH); Diethylene glycol monomethyl ether (2-(2-methoxyethoxy)ethanol, methyl carbitol, CH3OCH2CH2OCH2CH2OH); Diethylene glycol monoethyl ether (2-(2-ethoxyethoxy)ethanol, carbitol cellosolve, CH3CH2OCH2CH2OCH2CH2OH); and Diethylene glycol mono-n-butyl ether (2-(2-butoxyethoxy) ethanol, butyl carbitol, CH3CH2CH2CH2OCH2CH2OCH2CH2OH). The commercial product Carbitol™ (The DOW Chemical Company) is a glycol ether, Diethylene Glycol Monoethyl Ether, which can be used as a co-solvent.

Other solvents and co-solvents beyond those named can also be used, such as esters or ketones (such as water-soluble such compounds), and alcohols.

In embodiments, the solvent is not primarily aqueous.

pH Adjustment

In embodiments of the invention, the composition can include an additive that adjusts the pH of the composition in a desired direction. Examples of substances that can adjust the pH of a solution in the alkaline direction include sodium hydroxide, sodium phosphate and sodium metasilicate. For adjusting the pH of the solution in the acidic direction, HCl or other organic or inorganic acids can be used, thereby providing compositions of lower pH. A pH range between about 3 to 11.5 can be useful for the formulations of invention. A basic or acidic range can be chosen in light of anticipated contaminants. A cleaning cycle with one pH can be followed with one configured for another pH. A pH range between 7 and 11 can be favorable for cleaning of endoscopes and similar devices. A composition of any desired pH can be formulated and used depending on the surface and on the contaminants to be cleaned.

Buffers

In embodiments of the invention, the composition can include an additive to help maintain a desired pH of the composition. Appropriate buffering additives can include acetate, citrate, phosphate, tris-buffer and other known buffers as is known in buffering systems in chemistry and biology. Other buffering systems, especially bicarbonate and phosphate, are also suitable in the compositions of the invention. Phosphate can be used to keep the pH of the composition between 7 and 11, which may be favorable for cleaning of endoscopes and similar devices. A buffer based on sodium hydroxide and tri-sodium phosphate can also be used to make the carrier fluid.

Builders and Chelating Agents

In embodiments of the invention, the composition can include chelating agent(s) that can sequester calcium and other multivalent cations that can stabilize built-up solid matter. This can help in killing bacteria and in facilitating cleaning especially if the water used has some hardness or containing multivalent cations such as calcium. Removing Calcium can disrupt cell walls, which in turn can make the contaminant easier to remove. Removing calcium also can prevent the formation of scale if tap water is used for certain processing steps later. Examples of such a chelating substance include EDTA (ethylenediamine tetra acetic acid); tetra sodium ethylene diamine tetraacetic acid (available commercially as Versene™ from DOW Chemical Company); sodium metasilicate; phosphates including polyphosphates; and similar substances. The compositions can include builders, similar to chelating agents that sequester ions such as calcium or magnesium ions. An exemplary builder is sodium tripolyphosphate (STPP).

Antimicrobial Agents and Antibiotics

In embodiments of the invention, the liquid composition can include an antimicrobial additive. It should be understood that the term antimicrobials is intended to include any one or more of various categories of substances, such as antimicrobials, antiseptics, disinfectants, biocides, antibiotics, virucides, prion-inactivating agents, antifungals, antiparasitics, and the like. Antimicrobial substances include drugs, chemicals, or other substances that either kill or slow the growth of microbes. The category also includes any of a large variety of chemical compounds and physical agents that are used to destroy microorganisms or to prevent their growth or development.

Alcohol, and alcohol in combination with other compounds, is a class of proven surface sanitizers and disinfectants. A mixture of 70% ethanol or isopropanol diluted in water is effective against a wide spectrum of bacteria. The synergistic effect of 29.4% ethanol with dodecanoic acid is effective against a broad spectrum of bacteria, fungi, and viruses. Sometimes an alcohol can be combined with a quaternary ammonium antimicrobial such as is described herein.

Another category is aldehydes, such as formaldehyde, glutaraldehyde, or ortho-phthalaldehyde. These compounds have a wide microbiocidal activity and are sporicidal and fungicidal.

Agents such as chlorine and oxygen that are strong oxidizers, are widely used for antibacterial purposes. Examples of such oxidizing agents include: sodium hypochlorite (commonly known as bleach), one of whose precursors is dichloroisocyanurate; other hypochlorites such as calcium hypochlorite (it can be noted that hypochlorites yield an aqueous solution of hypochlorous acid that is the true disinfectant, with hypobromite solutions also being used sometimes); electrolyzed water or “Anolyte,” which is an oxidizing, acidic hypochlorite solution made by electrolysis of sodium chloride into sodium hypochlorite and hypochlorous acid (the predominant oxychlorine species being hypochlorous acid); chloramine, which is often used in drinking water treatment; chloramine-T (which is antibacterial even after the chlorine has been spent, because the parent compound is a sulfonamide antibiotic); chlorine dioxide (with sodium chlorite, sodium chlorate, and potassium chlorate being used as precursors for generating chlorine dioxide); hydrogen peroxide (which is used in hospitals to disinfect surfaces and it is used in solution alone or in combination with other chemicals as a high level disinfectant; is sometimes mixed with colloidal silver); iodine, sometimes in the form of tincture of iodine, or alternatively a commercially available product known as Povidone-iodine; peracetic acid, which is a disinfectant produced by reacting hydrogen peroxide with acetic acid; performic acid, which is the simplest and most powerful perorganic acid; other perorganic acids; potassium permanganate (KMnO4); and potassium peroxymonosulfate.

Quaternary ammonium compounds, sometimes referred to as “quats,” are a large group of related compounds. These substances are biocides that also kill algae. Examples include benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride and domiphen bromide. Biguanide compounds, including chlorhexidine (CHX) and polyhexamethylene biguanide (PHMB), represent another class of cationic antimicrobial compounds that are effective against a wide spectrum of organisms. Specifically, biguanides are attractive antimicrobials for use in the present invention because resistant strains have not appeared since their discovery more than 50 years ago.

Phenolics are active ingredients in some household disinfectants, some mouthwashes and in disinfectant soap and handwashes. They include the following substances: phenol (formerly called carbolic acid); o-Phenylphenol, which is often used instead of phenol, since it is somewhat less corrosive; Chloroxylenol; hexachlorophene; thymol (a phenolic chemical found in thyme); amylmetacresol; and 2,4-dichlorobenzyl alcohol.

Still other known antimicrobial substances include: silver dihydrogen citrate (SDC), which is a chelated form of silver that maintains its stability; biguanide polymer; polyaminopropyl biguanide; sodium bicarbonate ($NaHCO_3$), which has antifungal properties; lactic acid; copper-alloy surfaces. In the 1940s and early 1950s, studies showed inactivation of diverse bacteria, influenza virus, and *Penicillium chrysoge-*

*num* (previously *P. notatum*) mold fungus using various glycols, principally propylene glycol and triethylene glycol.

Antibiotics including all classes [see e.g. Anthony RM Coates, Gerry Halls, and Yanmin Hu, "Novel classes of antibiotics or more of the same?", Br J Pharmacol. 2011 May; 163(1): 184-194] can also be used as antimicrobial agents in the compositions of the invention.

Viscosity Modifiers and Gel-Forming Substances

In embodiments of the invention, the composition can include a gel forming substance or a viscosity modifier. For example, a Minute Fibril formulation can be further modified with a gel forming substance (not comprising Minute Fibrils) or a viscosity modifier.

A viscosity modifier can be a substance that, when dissolved in water or an aqueous solution or a carrier fluid used in the invention, increases the viscosity. Examples of such substances include: carboxymethyl cellulose, hydroxyethylcellulose; hydroxy propyl methyl cellulose; polyvinyl alcohol; polyvinyl acetate copolymer; polyvinyl pyrrolidone; and the like. Such additives can increase the viscosity of water from its ordinary value of approximately 1 centipoise to a value in the range of 500 to 10000 centipoise (mPa.$) or more. Such property can also work as a suspending agent to prevent possible separation of components, provide stability, and provide a composition with a longer shelf life. Other polymers that can increase the yield shear stress and stiffness of the gel network such as carbopols and the like can also be used as described elsewhere herein In embodiments of the invention there can be provided gels, which can be homogeneous gels (without fibers or Minute Fibrils), which can be hydrogels. Such gels provide a viscosity greater than the viscosity of water such as in the range between 100 to 10,000 centipoise or higher. For a description such as this, realizing that for a non-Newtonian fluid the viscosity is a function of shear rate, the viscosity discussed can be an average or effective viscosity at conditions of interest for cleaning applications. Such viscosity can be the value of the viscosity that, when used in the Hagen-Poiseuille Law, best correlates an observed volumetric flowrate and an observed pressure drop. A homogeneous composition can be made with small molecular weight viscosity enhancing compounds such as glycerol or sugars, or from macromolecules either cellulosic or non-cellulosic, or from inorganic gel forming substances such as silica or clays including laponite, hectorite, bentonite or others. Such gels, even if they do not contain solids or fibers (as described elsewhere herein), can have usefulness for decontamination. Compositions based on homogeneous gels can be for storage of a medical device or an article, as discussed in various places herein. Also, such gels can have some usefulness for cleaning as described elsewhere herein.

A factor that can influence the choice of a gel forming agent or viscosity modifier is the ease with which that substance can be rinsed from the channel after residing in the channel. Some gel-forming substances are very soluble in water, which contributes to their ability to be rinsed out. For example, polyethylene oxide (PEO) and polyethylene glycol (PEG) of intermediate or high molecular weight are highly water-soluble and are easy to rinse out. As long as such compositions can hold a sufficient amount of various additional substances, they can be useful according to embodiments of the invention.

Hygroscopic Additives

In embodiments of the invention, especially if a composition is intended to remain inside a passageway of a medical device, or in contact with a surface, for an extended period of time (e.g., for storage), the fluid composition can be hygroscopic or can contain a humectant, so as to inhibit drying over extended periods of time. Drying can increase the adherence of contaminants. Hygroscopic or humectant additives include: propylene glycol; hexylene glycol; butylene glycol; glyceryl triacetate; neoagarobiose; sugar alcohols (sugar polyols) such as glycerol, sorbitol, xylitol, maltitol; and the like. Some substances that serve as viscosity modifiers or gel formers can also serve this purpose. Other hygroscopic additives include: polyvinyl alcohol; polyethyleneglycol; hydroxypropylmethylcellulose; polyacrylic acid (available as Carbomer®); polyvinyl pyrrolidone. These substances are hygroscopic as well as hydrophilic. There is a tendency for hydrophilic substances to also be hygroscopic to at least some extent.

Preservative

In embodiments of the invention, the composition can include a preservative, especially for some of the compositions. For example, it can be appropriate to include a preservative in compositions that contain ingredients such as guar gum, xanthan gum, carrageenan, or other substances which could support the growth of bacteria. Preservatives include but are not limited to: 1,2 Benzisothiazolin-3-one (BIT) (Koralone B-119, available from DuPont); 5-chloro-2-methyl-4-isothiazolin-3-one/2-methyl-4-isothiazolin-3-one and 2-Bromo-2-nitro-1,3-propanediol (CMIT/MIT and Bronopol, available from DuPont); octyl-4-isothiazolin (MIT, OIT, available from DuPont) and phenoxyethanol (Bioban PH 100, available from DuPont) These preservatives are pH stable, and function at high pH. Other preservatives may include parabens, benzoic acid, sodium benzoate, sorbic acid, citric acid and others. Concentrations can be selected that prevent growth and provide a product shelf life of about one year or more.

Adjuvants

Compositions of embodiments can include a number adjuvants (color, preservative, suspending agent, flavor, and others as known in the art). Appropriate additives for these purposes can be used.

Taking into account the just-described types of additives and ingredients, following are some possible formulations of carrier fluids, more specifically aqueous carrier fluids that can be used in embodiments of the invention.

Fluorescent Substances

In an embodiment of the invention, it is possible that the cleaning composition (NanoClean) can comprise a substance that fluoresces (emits visible light) when it is exposed to ultraviolet light. An example of a suitable substance that fluoresces is riboflavin (Vitamin B2). Use of such an additive can provide a useful indicator to personnel performing the cleaning. It can indicate when and where the cleaning composition (NanoClean) is present, especially with respect to irregular surfaces of the object being cleaned. It also can indicate if the cleaning composition (NanoClean) has been fully rinsed from various surfaces, especially irregular geometries of the object being cleaned. It can be noted that the use of ultraviolet light to cause fluorescence is consistent with the fact that ultraviolet light also has some effect in killing bacteria and promoting disinfection. Thus, the use of ultraviolet light to detect the presence or absence of cleaning composition (NanoClean) could also have a secondary benefit. For example, the type of ultraviolet light used to create fluorescence could be UV A (365 nm) Inspection lamps.

Additional Additives

In an embodiment, antimicrobial or antibiotics or drugs can be incorporated in SAP for example by swelling SAP with a solution of the drug or compound and then using the treated SAPs in making the inventive compositions. These hybrid compositions can provide bothcleaning and disinfection functions or function to as drug delivery vehicle. During cleaning the forces imposed on the composition including shear, pressure and normal forces can facilitate and enhance the release the active drugs and deliver them to the surface during treatment. Chlorohexidine, Quats (quaternary ammonium compounds), Lauryl arginate ester (LAE), antibiotics of all classes or similar compounds, are example compounds that can be considered in this case, If the liquid that is absorbed into the SAP particle contains a drug or antibiotic, then the SAP particles can be viewed as a reservoir of that substance and may release it over time during cleaning or surface treatment or when the compositions is used to treat skin or tissue and remains there for some time. Possible antibiotics include but are not limited to: Hypocholesterolemic agents; Lipopeptide; Macrolides; Monobactams; Nitrofurans; Oxazolidinones; Polypeptides; Quinolones; Sulfonamides; Tetracyclines; Lincosamides; Glycopeptides; Immunosuppressive agents; Anti-migraine agents; Anti-bacterial s; Antifungals; Penicillins; Aminoglycosides; Ansamycins; Carbapenems; Cephalosporins; Fluoroquinolones Similarly, the liquid that is absorbed into the SAP particle can contain surfactants, flavors, lubricants, moisturizers or other substances. The above embodiments can be viewed to be novel in the art of using SAP for cleaning and for other application including drug release and drug delivery.

Antimicrobial compositions can be made with quaternary ammonium compounds (quats). Some composition made with quats become more effective at high pH of about 10 to 11. Addition of sufficient glycol ether or other co-solvents can make such formulations effective against mycobacteria when the pH is about 10 to 11 or preferably more than 11.0.

SAP particle strength in the swollen state can be manipulated by saturating the SAP particles with alcohols, glycols and PEGS of different molecular weights (400 to 10,000 Daltons). These agents can be used to adjust the gel strength of the whole composite. Instead of swelling SAP with water, swelling is made with one of the above compounds or their solution in water where they impart strength to the SAP particles. This can refer to the strength of an individual particle and also the strength of the overall composition. In an embodiment of the invention, the SAP used in the composition may be modified by absorbing some compounds that retard water absorption, and that can made SAP particle stronger or with stiffer elastic properties compared to SAP swollen in pure water only.

SAP can be loaded with surfactant by swelling as described above and the resulting SAP can be used to make the inventive compositions to remove other contaminants from the surface, such as simethicone as an example of a contaminant. SAP can be loaded with high-level disinfectants so that cleaning and high-level disinfection may be achieved in a single step. These compositions can be used for surface cleaning and disinfection such as for endoscopes, for hand washing or on skin as desired.

The compositions of the invention can include active molecules or drugs that can impart specific function to such composition. Such actives may include but not limited to: antimicrobials, antibiotics, drugs of all classes, lubricants, solvents, surfactant of all types, emulsifiers, moisturizing compounds, dispersants, flocculants, de-flocculants, and polymers of all types. In embodiment, the inventive composition can provide functions other than or in addition to cleaning or to treating a surface. These applications may include skin cleaning, skin treatment, wound debridement, acne treatment, skin dehydration, nasal decolonization, and other treatments. One skilled in the art may employ some form of the composition using other compounds to add new function or other utility based on the teachings of the present invention.

Osmotic Considerations

The liquid vehicle used to make the inventive compositions typically includes salts, surfactants, polymers, and other ingredients that contribute to cleaning and also influence the osmolality of the composition. Osmotic concentration, formerly known as osmolarity, is the measure of solute concentration and more particularly of the number of ions present.

The swelling of SAPs within the compositions is influenced by the osmolality of the liquid vehicle, which is absorbed into the SAP. CRC values, which are measured using a protocol using pure water, can provide guidance as to water absorption by SAP particles. However, in embodiments of the invention the liquid being absorbed into the SAP particles is not pure water, and absorption is different if the liquid is something other than pure water. Therefore, it is the osmolality and ionic strength that determine the actual absorbency of the SAP in the composition. This situation may be similar to consideration employed when absorption of urine in diapers or hygiene pads; in this case saline or other simulated fluids with similar osmolality are used in testing SAP-containing products. The osmolality of the liquid vehicle may be chosen so that the liquid vehicle absorbs into the SAP particles to a desired extent.

In embodiments of the invention that involve exposure of bodily tissues to the cleaning composition, it may be desirable that the osmolality of the cleaning composition be chosen to be similar to the osmolality of bodily fluids. This may be the case for applications involving treatment of wounds, or toothpaste, or other similar applications. In this way, the cleaning composition will not tend to either remove fluids from the body by osmosis or add fluids to the body by osmosis.

In an embodiment, the osmolality of the composition may be controlled by the ingredients of the liquid vehicles of the compositions and their concentrations. In some compositions, compounds such as salts or osmogenes such as glycerin or polyethylene glycols (PEGs), or alcohols can be included to control the osmolality of the compositions as desired. In some experiments we found that PEGS with molecular weight between 400 and 3350 Daltons or higher can be used to modulate the absorbency of the SAP in the compositions. The embodiments should not be limited to the type or the concentration of the osmogenes sued in the compositions of the invention.

Misc. Parameters

WO2018064284A1 contains further operative information that can be of use to this invention, including at ¶¶108-116 and 142-182. Topics include Rinsing, Optional Minimization of Lubricious Substances, Shear Thinning and Substantial Plug Flow, Mixing Parameters for Composition Preparation, Channel Bias, Segmented Flow, Negative Pressure, Medical Device Prep, Device Storage, Oral Use, Cleaning Contaminant Targets, Apparatuses and Additional Methods for Cleaning an Open Surface, Sterility, Additional Carrier Fluids, and Other Surfaces to Be Cleaned.

Mechanisms of Cleaning

While not being bound by theory, possible mechanisms of cleaning can be further illustrated with reference to FIGS. 4A through 4D.

Figure 4A:
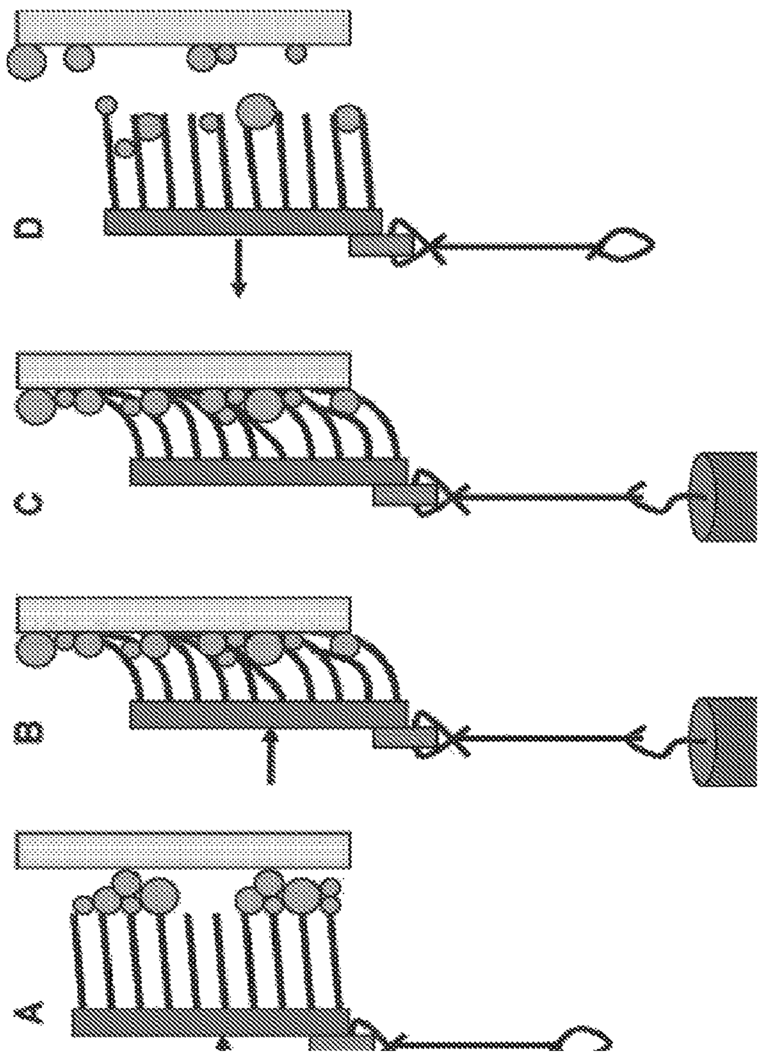
FIGS. 4A to 4D show possible cleaning mechanisms.

FIG. 4A is a representation of the situation that occurs with a conventional brush with bristles. The bristles apply a shear force where the bristles contact the surfaces and typically during brushing there is also some normal force applied (as shown in B), with the brush being pushed against the surface. Usually, cleaning by this method is incomplete.

Figure 4B:
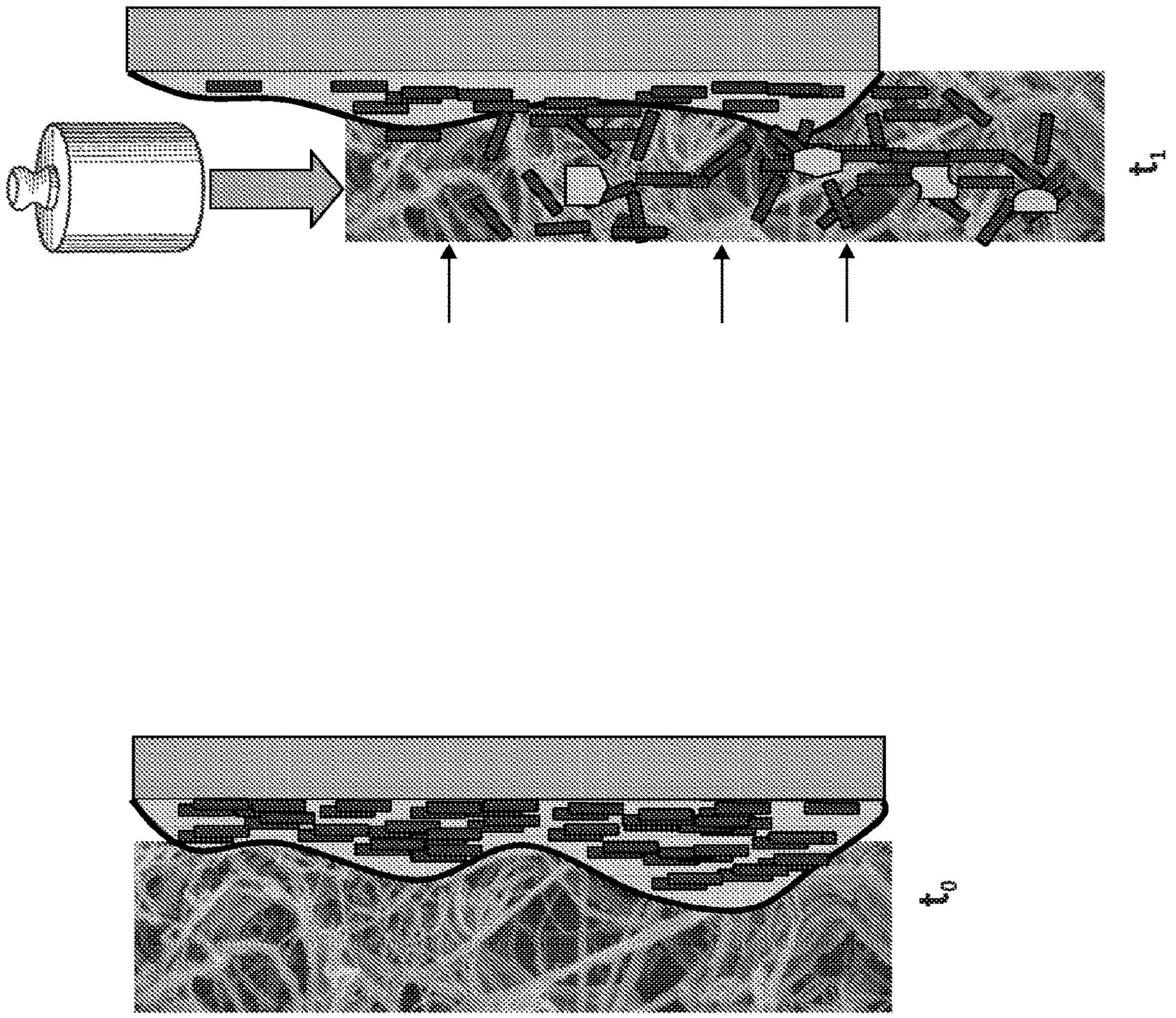
Figure 4C:
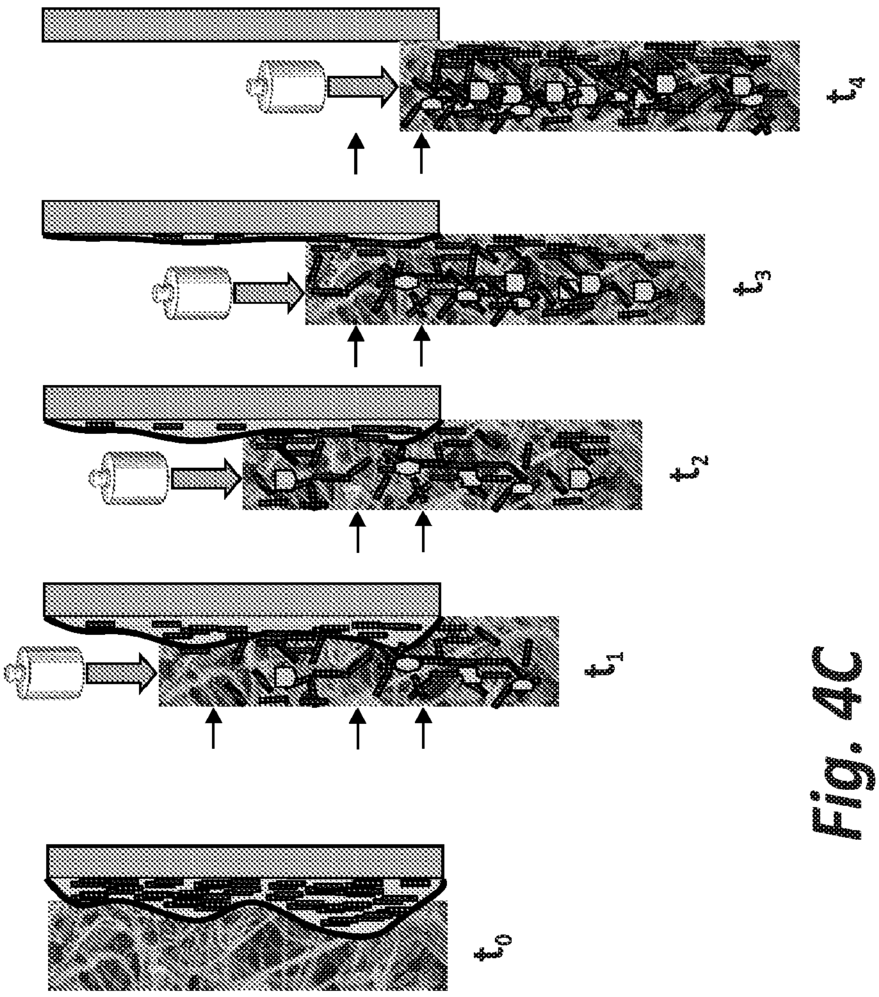
Figure 4D:
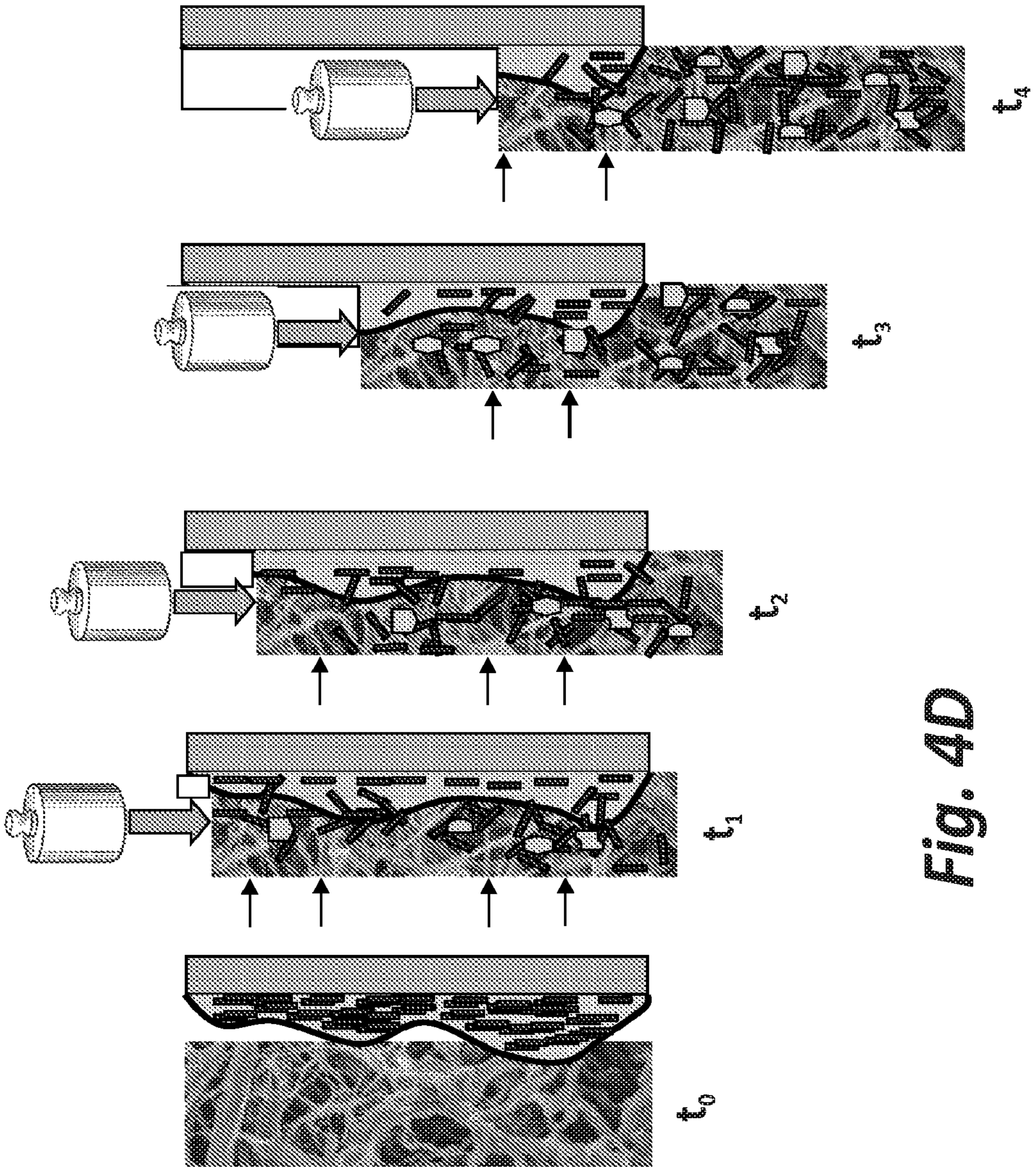

As illustrated in FIG. 4B, the composition makes contact with the biofilm. When you apply normal force and shear force, you engage the biofilm and you start removing fragments of biofilm after some time. The normal force can be intentionally applied when cleaning open surfaces or can be created in situ when flowing the compositions in tubes under pressure. In the latter the normal force arises due the elastic component (G') of the viscoelastic (VE) composition. As illustrated in FIG. 4B, normal and shear forces help to remove biofilm with the 3-D network. The network is illustrated in FIGS. 4B-4D as a fibrous mass. The network may include relatively stiff particles incorporated into the network as friction elements (not illustrated). Within the biofilm, bacteria are illustrated as rod-like structures.

There are two possible scenarios of interaction of the composition with the biofilm to remove the biofilm. One situation, as illustrated in FIG. 4C, is the situation in which the network is stronger than the biofilm. In this situation, when you have shear and normal forces, you can actually remove the entire biofilm as a fairly complete entity. This is different from, and better than, the case of the bristles on a brush. Fragments of the biofilm become incorporated in the composition and are moved away and removed. In order to accomplish this, both shear force and normal force (of the cleaning composition on the biofilm) are involved. Normal force arises because of the elastic component of the viscoelastic composition, which is realized during flow under pressure in narrow tubes or on other surface geometries.

The other possible scenario is a situation in which the network is of similar strength to the biofilm or is weaker than the biofilm. This is illustrated in FIG. 4D. In this situation, not all of the biofilm is removed right away, but the biofilm is removed progressively, perhaps by an erosion-like mechanism. After a sufficient period of time, all of the biofilm is removed.

In endoscope situations, there is a limit on average wall shear stress because of the limit on pressure within the tube of the endoscope. It is believed that in addition to the contribution of bulk or average shear stress to cleaning, the invention achieves cleaning by creating localized peaks of shear stress at the wall, and at the peaks the localized shear interaction with the wall are larger than the average shear stress at the wall. These localized peak interactions may be due to the interaction of flocs, or fibers, or particles of hard material, or particles of SAP, interacting with contaminants. Such interaction may comprise friction forces that can erode strong contaminants such as BBF.

Another believed principle is that one seeks to have a volume entirely filled with solids so that the formed composition contacts and engages in friction with the surface to be cleaned, and effects cleaning by contact or erosion-like mechanisms.

Further Thoughts and Applications

The described compositions and methods may be used with an automated dispenser that has the ability to reliably and conveniently and verifiably deliver the gel to the endoscope being treated. Rinsing with water may preferably be done in the turbulent regime. About more than 2 liters of rinse liquid per channel, for a typical endoscope, may be used to ensure effective rinsing. This was found to be effective in obtaining a very clean surface without loose particles remaining at the end of the cycle. Flow rates of rinse water between 100 ml/minute to 3000 ml/minute may be used to perform rinsing the channels. Air purge after cleaning and rinsing for one minute was found to be effective in removing residual water from the channels.

In an embodiment of the invention, it is possible to provide an apparatus that delivers, to a particular channel being cleaned, a sequence or series of plugs of different fluids. For example, the plugs could be a plug of cleaning composition followed by a plug of water, with those plugs alternating with each other repeatedly. More generally, it would be possible to have plugs of cleaning composition, plugs of water and plugs of air in any sequence or combination. In such an operating scenario, the plugs of water could help to clear out contaminants that may have been loosened by a previous plug of cleaning composition, and could help carry such contaminants to the exit of the channel. Flowing a series of plugs of various fluids also could reduce the total amount of cleaning composition that is used. For example, rinse water is less expensive than the cleaning composition. In experiments, we found that injecting a series of plugs of the composition having about 1 to 2 feet long followed by water injection to send such plug to the exit of the channel and repeating this sequence about 6 to 10 times, excellent removal of BBF8 was achieved. This discovery constitutes a new method for applying the inventive composition to remove BBF and other contaminants with less volume of the compositions and in shorter time. In an embodiment of the invention we disclose an apparatus to execute such methods. The sequences can be modified or altered to achieve the desired cleaning results. It appears that long plugs of inventive compositions can remove BBF and contaminants from channels and this may constitute a new cleaning method. In other words, it may not be necessary to flow the compositions through the entire length of the channel all of the time in order to obtain effective removal of BBF or similar contaminants. The use of short or alternating plugs of fluid appears to lower the hydrodynamic resistance during cleaning of long narrow channels. The invention should not be limited to the sequence used or to fluid used to propel plugs of the composition through the channels. Composition plugs should be long enough so that they do not become destroyed during cleaning according these new methods. Persons skilled in the art may use different sequences or different combinations to optimize the process; however, such manipulations or optimization are contemplated based on the teachings provided in this disclosure.

SAP particles swollen in water can be viewed as polymer particles including a plasticizer, where water here is the functional plasticizer. In an embodiment of the invention, SAP properties used in the inventive composition can be modified with organic compounds such as alcohols, glycols, solvents, PEGS and polymer solutions to tailor their mechanical strength, water absorption or elasticity. This process can be used to adjust the rheology and mechanical properties of the final composite or cleaning compositions of the present invention. These new SAP materials represent a new dimension in making SAP with special mechanical properties that would provide good cleaning results per embodiments of the invention. Solution of hydroxy propyl cellulose (HPC) or similar polymers in water can be used to modify SAP particles for use in the compositions as described elsewhere herein. This can be achieved by absorbing the HPC solution into SAP particles prior to forming the compositions. Compositions made with modified SAP can exhibit a range of mechanical properties that can be more effective in surface treatments or surface cleaning as desired.

In embodiments of the invention, a mixture of two or more kinds of superabsorbents (SAP) can be used to make the viscoelastic composition, such as one SAP with lower CRC and another SAP with higher CRC. They can differ in their chemical composition, their manufacturing method, or any other respect.

In embodiments of the invention, it is possible that fibrillated material such as Minute Fibrils can be made of a material that is resorbable. Similarly, in embodiments of the invention, solid particles can be made of a material that is resorbable. Examples of materials that are resorbable include PLGA (poly lactic co-glycolic acid) and related resorbable polymers. Resorbable fibers in fibrillated form made by electrospinning. Another resorbable material is collagen, and another is beta tricalcium phosphate.

Chewing gum compositions can be made in which polymers and active antimicrobial can be incorporated as described elsewhere herein. Compounds such as Lauryl arginate ester (LAE), essential oils, chlorhexidine, and flavors can be included in the compositions.

The inventive compositions can be used in wound management and treatment. Biofilm removal, wound debridement and delivery of drugs provide examples of the functions that can be achieved with the compositions of the invention with respect to wound management and to skin treatment at large. For surgical prep, it has been determined that compositions of the invention can render skin sterile for purposes of surgery, and that such sterile state stays in place for a substantial period thereafter.

Inventive compositions have been formulated to treat acne and other skin conditions. Compositions that include LAE were made and tested. They were found to improve skin conditions of persons with acne; they made the skin smoother and decreased the frequency of new breakouts. The compositions made included SAP, MFC, MCC and surfactants. Some formulations were made without LAE and they appear to have beneficial effects on skin. Formulations for skin applications were made in saline solution, buffers and at physiologic pH. Some compositions having higher pH from about 8 to 11 were found to provides better removal of biofilms and organisms from skin. Such compositions can be used as hand wash, body wash, nasal canal wash, and on or in other parts of human or animal body.

A new class of cleaning compositions is disclosed in the present invention. These compositions function by new cleaning mechanisms and are fundamentally different from current conventional industry cleaners such dishwashing cleaners or hard surface cleaners that are mostly based on detergent/surfactant action and that are mostly delivered to the surface as a solution in water. For the past hundred years, conventional cleaning has been achieved by the detersive action of soaps and surfactants and depends on liquid flow or mechanical action which either may be manual or may be automated as in dishwashers. This new class of cleaning compositions is based on new mechanisms not known in the cleaning industry. The new cleaning compositions include SAPs as an ingredient that can effect surface cleaning according to a new mechanism. We discovered that SAPs can remove contaminants and biofilms from surfaces by some sloughing mechanism and possibly by the formation of new material phases arising from some form of intermixing between the SAPs and the contaminants as described elsewhere herein. Other complementary mechanisms, including abrasion, erosion and detachment, can be combined with the sloughing mechanism imparted by SAPs to provide broad spectrum surface cleaning compositions that are more robust compared to compositions based on SAPs alone. The erosion and abrasion components of the new cleaning compositions can include MFC and some form of particles such as MCC, SMCC and silica or the like. The new compositions are effective because they contact with the surface to be cleaned and in this way they are different and distinct from conventional cleaners, which depend of surfactant action or detersive function and suffer from the boundary layer limitation of low shear stress near or at the surface as described above.

SAPs can function as a vehicle to deliver drugs or compounds to a surface during treatment or cleaning. There is no limitation as to the type of drug or agent that can be used according to the invention.

In an embodiment, SAP, MFC and MCC and their combination may be used to remove biofilms and bioburden from breast implants and other medical implants before surgery, or during revision surgery after implantation. There is no known way to effectively remove BBF and other forms of biofilms from surface of breast implants because, as described elsewhere herein, conventional cleaning methods do not work. This embodiment is not limited to breast implants but can be applied generally to any implanted device and can be used or employed both outside and inside the body of a host.

SAP based compositions and their variations can be used to clean poultry, meat surfaces or other biological tissue or food due to their high effectiveness in removing biofilm and contaminants from various surfaces.

The compositions of the invention can be used to clean skin in general. Inventive compositions were found to remove biofilms from hands and body as per ATP testing using the 3M ATP device Trace. ATP RLU decreased from about 9999 RLU to about 0 to 3 RLU or less than 10 RLU.

The compositions of the invention were found to achieve effective nasal canal decolonization as tested by ATP. Nasal decolonization has become the standard of care in healthcare to avoid staph MRSA infections. ATP in RLU units decreased from about 9999 before swabbing with the composition to about less than 10 RLU or less than 3 RLU after swapping or spraying the nasal canal with a composition comprising MFC, MCC and a surfactant at pH 8.5 or higher followed by water rinsing. Testing was repeated more than 50 times using human subjects and the same results were achieved, namely effective decolonization of the mucosal surface of the nasal cavity. A composition comprising SAP, MFC, MCC/SMM and surfactant (LV8) with pH from 7.0 to 10.0 was also found to be equally effective in nasal decolonization as tested by ATP tester marketed by 3M under trade name "Trace". In an embodiment, compositions of the invention were found to provide effective decolonization of the nasal cavity. They can be used to treat the sinuses to remove biofilms, dead tissues, solid mucous and allergens. The embodiment is equally applicable to other decontaminating or decolonizing other mucosal tissues including oral, intestinal, eye, urinary tract and tissue of the reproductive tract both in men and women. The treatment is not intended to be limited to removing biofilms, and the treatment can include removing forms of diseased tissues, blood clots and debris of any forms. The compositions can be used for cleaning, treatment, drug delivery and their combination without limitation.

The compositions of the invention may include fluorides of different forms both in soluble form (sodium fluoride, fluorophosphates) or particulate form such as fluoride-containing abrasive particles.

Additional applications for which compositions of embodiments of the invention can be used include: dental applications; cosmetics; deodorant; removal of smoke odor and other odors; nasal decolonization; sinus treatment; site preparation for implanting a needle or catheter; wound management; dandruff removal; and veterinary products. Surface cleaning is covered without exclusions.

In an embodiment, inclusion of SAPs in cleaning compositions provides a new direction in surface cleaning as described elsewhere herein. When SAPs are included and when they may make contact with the surface, they remove contaminants and biofilms by mechanisms distinct from known detersive action of conventional detergents or enzymatic cleaners. The latter mostly work by known detergent action including lowering surface tension as is known in the art of cleaning. Accordingly, compositions comprising SAPs, surfactants and cleaning additives are more effective than conventional detergents in achieving better surface cleaning because of the new and more effective cleaning mechanisms involving direct interaction of SAP with biofilms and contaminants, and in this way the compositions of the invention do not suffer from the low shear stress at the surface known to be present in liquid cleaning. When SAPs are used in cleaning compositions, either alone or with MFC or with MCC or with their combinations, they may provide better removal of biofilms, BBF and other contaminants more effectively compared to detergent-based cleaners that are based on liquid cleaning action. The latter mostly works by detersive mechanism that removes dirt interaction with surfactant or by solubilization or by emulsification as it is known in the art of detergency, and in this context such detersive mechanism lack direct contact with the surface to be cleaned as described herein.

In embodiments of the invention, viscoelastic cleaning compositions comprising SAPs either alone or with MFC or with stiffening/friction elements/particulate such as MCC or the like, or with both MFC and MCC are disclosed. The viscoelastic properties can be characterized by G' and G" and by the yield stress of the composition. Preferred viscoelastic cleaning or surface treatment compositions may have G' higher than G" and typically have a yield stress, preferably more than 5 Pa. The viscoelastic compositions exhibit G' higher than about 500 Pa and preferably more than 1500 Pa. The ratio G'/G" may be about from 2 to 10 at small percent strain. The compositions normally manifest a linear viscoelastic region at reasonable percent strain more than 2% and can remain elastic (G'>G") during flow and cleaning. SAP, MFC and MCC can be used in some proportions to make the viscoelastic cleaning compositions. The cleaning compositions may make direct contact with the surface during cleaning and can operate by several mechanisms including sloughing, friction and erosion or their combinations. The viscoelastic compositions may overcome the limitation of conventional liquid cleaning and may eliminate the disadvantage of low shear stress arising from the nearly stagnant boundary layer at the surface during flow of ordinary (simple composition water-like) liquid. The compositions behave as a viscoelastic material and preferably possess reasonable elastic component during flow and cleaning. The G' and yield stress can be adjusted so that the compositions do not transform into viscous fluid during flow and cleaning. Such adjustment can be made by selecting SAP, MFC and the stiffening/friction elements/particles that make up the viscoelastic compositions.

This invention described herein includes a cleaning composition and methods of forming and using the same. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims. More specifically, those of skill will recognize that any embodiment described herein that those of skill would recognize could advantageously have a sub-feature of another embodiment, is described as having that sub-feature.

RELATED APPLICATIONS

This patent application claims the benefit of: Provisional patent application U.S. Ser. No. 62/652,079, filed Apr. 3, 2018 (was NOVA003P3 now NOVA004P1); and Provisional patent application U.S. Ser. No. 62/692,082 filed Jun. 29, 2018 (was NOVA003P4 now NOVA004P2); Provisional patent application U.S. Ser. No. 62/822,432 filed Mar. 22, 2019 (NOVA003P5 now NOVA004P3); and Provisional patent application U.S. Ser. No. 62/828,134 filed Apr. 2, 2019 (NOVA004P4).

This patent application also is related to, but does not claim priority to: Provisional patent application U.S. Ser. No. 62/402,394, filed Sep. 30, 2016, including its appendix; Provisional patent application U.S. Ser. No. 62/563,975, filed Sep. 27, 2017 (NOVA003P2), including its appendices; Nonprovisional patent application U.S. Ser. No. 15/718,325, filed Sep. 28, 2017, which published as US20180094214A1; PCT patent application PCT/US17/53925, filed Sep. 28, 2017, which published as WO2018064284A1.

All of these related applications are incorporated by reference herein in their entireties.

NUMBERED EMBODIMENTS

The invention can be further described with reference to the following numbered embodiments:

Embodiment 1. A cleaning composition comprising a carrier fluid comprising in the carrier fluid polymer comprising particulate super absorbent polymer (PSAP), wherein the PSAP as in the cleaning composition is substantially at the percolation volume fraction or higher; wherein the cleaning composition can be passed over a surface driven by a pressure drop effective to render the composition traditional biofilm (TBF) cleaning effective and protein cleaning effective.

Embodiment A1. A cleaning composition comprising a carrier fluid comprising in the carrier fluid polymer comprising particulate super absorbent polymer (PSAP) and solid particles, wherein the PSAP as in the cleaning composition is substantially at the percolation volume fraction or higher; wherein the cleaning composition can be passed over a surface driven by a pressure drop effective to render the composition traditional biofilm (TBF) cleaning effective and protein cleaning effective; and wherein the solid particles are effective allow the composition to clean TBF more rapidly (than the composition lacking solid particles).

Embodiment B1. A cleaning composition comprising a carrier fluid comprising in the carrier fluid polymer comprising particulate super absorbent polymer (PSAP) and minute fibrils (MF), wherein the PSAP as in the cleaning composition is substantially at the percolation volume fraction or higher; wherein the cleaning composition can be passed over a surface driven by a pressure drop effective to render the composition built-up biofilm (BBF) cleaning effective and protein cleaning effective; and wherein the PSAP is effective allow the composition to clean BBF more rapidly (than the composition lacking PSAP).

Embodiment C1. A cleaning composition comprising a carrier fluid comprising in the carrier fluid polymer comprising particulate super absorbent polymer (PSAP), minute fibrils (MFs) and solid particles, wherein the PSAP as in the cleaning composition is substantially at the percolation volume fraction or higher; wherein the cleaning composition can be passed over a surface driven by a pressure drop effective to render the composition build-up biofilm (BBF) cleaning effective and protein cleaning effective.

Embodiment M1. A method of cleaning a surface, comprising, providing a cleaning composition of Embodiment 1; and causing the cleaning composition to pass over the surface driven by a pressure drop effective to render the composition traditional biofilm (TBF) cleaning effective and protein cleaning effective.

Embodiment MA1. A method of cleaning a surface, comprising, providing a cleaning composition of Embodiment A1; and causing the cleaning composition to pass over the surface driven by a pressure drop effective to render the composition traditional biofilm (TBF) cleaning effective and protein cleaning effective.

Embodiment MB1. A method of cleaning a surface, comprising, providing a cleaning composition of Embodiment B1; and causing the cleaning composition to pass over the surface driven by a pressure drop effective to render the composition built-up biofilm (BBF) cleaning effective and protein cleaning effective.

Embodiment MC1. A method of cleaning a surface, comprising, providing a cleaning composition of Embodiment 1; and causing the cleaning composition to pass over the surface driven by a pressure drop effective to render the composition built-up biofilm (BBF) cleaning effective and protein cleaning effective.

Embodiment 2. The composition of one of Embodiment 1, A1, B1 or C1, or the method of one of Embodiments M1, MA1, MB1 or MC1, or a combination with one or more of Embodiments 1-22, wherein when pushed through a 1.37 mm ID tube of 6 ft. length at 20 psi the composition moves at about 3 mL/min or better.

Embodiment 3. The composition of one of Embodiment 1, A1, B1 or C1, or the method of one of Embodiments M1, MA1, MB1 or MC1, or a combination with one or more of Embodiments 1-22, wherein the composition has an osmolarity of or 50 mOsmol/kg or higher (or 100 mOsmol/kg or higher) (or 200 mOsmol/kg or higher; or 260 mOsmol/kg to 315 mOsmol/kg).

Embodiment 4. The composition of one of Embodiment 1, A1, B1 or C1, or the method of one of Embodiments M1, MA1, MB1 or MC1, or a combination with one or more of Embodiments 1-22, wherein the composition is shear thinning.

Embodiment 5. The composition of one of Embodiment 1, A1, B1 or C1, or the method of one of Embodiments M1, MA1, MB1 or MC1, or a combination with one or more of Embodiments 1-22, wherein the composition has a storage modulus G' at 0 rads/s or 0.1 percent shear strain of 250 Pa or higher (such as 500 to 3500 Pa) Embodiment 6. The composition of one of Embodiment 1, A1, B1 or C1, or the method of one of Embodiments M1, MA1, MB1 or MC1, or a combination with one or more of Embodiments 1-22, wherein the composition has a loss modulus at a 0.1 percent shear strain of 0.5 Pa or less.

Embodiment 7. The composition of one of Embodiment 1, A1, B1 or C1, or the method of one of Embodiments M1, MA1, MB1 or MC1, or a combination with one or more of Embodiments 1-22, wherein the composition has a yield shear stress of 1 Pa or more (or 5 Pa or more).

Embodiment 8. The composition of one of Embodiment 1, A1, B1 or C1, or the method of one of Embodiments M1, MA1, MB1 or MC1, or a combination with one or more of Embodiments 1-22, wherein the composition comprises a bioactive agent. (A bioactive agent is a substance such as a chemical that can act on a cell, virus, tissue, organ or organism, including but not limited to drugs (i.e., pharmaceuticals) to create a change in the functioning of the cell, virus, organ or organism to achieve a pharmaceutical or therapeutic effect.)

Embodiment 9. The composition of one of Embodiment 1, A1, B1 or C1, or the method of one of Embodiments M1, MA1, MB1 or MC1, or a combination with one or more of Embodiments 1-22, wherein the composition comprises two or more compositions of PSAP with distinct shape or CRC ranges.

Embodiment 10. The composition of one of Embodiment 1, A1, B1 or C1, or the method of one of Embodiments M1, MA1, MB1 or MC1, or a combination with one or more of Embodiments 1-22, wherein the PSAP particles have cleavage surfaces and sharp edges.

Embodiment 11. The composition of one of Embodiment 1 or B1, or the method of one of Embodiments M1 or MB1, or a combination with one or more of Embodiments 1-22, wherein the composition comprises solid particles effective allow the composition to clean TBF more rapidly than a corresponding composition without said solid particles.

Embodiment 12. The composition of one of Embodiment 1, A1, B1 or C1, or the method of one of Embodiments M1, MA1, MB1 or MC1, or a combination with one or more of Embodiments 1-22, wherein solid particles are comprised and are semi-crystalline (with a minor portion (less than 50%) of amorphous domains) and elongated with an average length of about 40 microns or more (or 70 microns or more). (Average length by random selection of 20 particles as spread on a flat surface.)

Embodiment 13. The composition of one of Embodiment 1, A1, B1 or C1, or the method of one of Embodiments M1, MA1, MB1 or MC1, or a combination with one or more of Embodiments 1-22, wherein solid particles are comprised and are 0.1% to 2% by wt. of the composition.

Embodiment 14. The composition of one of Embodiment 1, A1, B1 or C1, or the method of one of Embodiments M1, MA1, MB1 or MC1, or a combination with one or more of Embodiments 1-22, further comprising minute fibrils (MFs), wherein the cleaning composition can be passed over a surface driven by a pressure drop effective to render the composition build-up biofilm (BBF) cleaning effective and protein cleaning effective.

Embodiment 15. The composition of one of Embodiment 1, A1, B1 or C1, or the method of one of Embodiments M1, MA1, MB1 or MC1, or a combination with one or more of Embodiments 1-22, wherein the storage modulus G' at 0.1 percent shear strain is greater than the loss modulus G" at 0.1 percent shear strain.

Embodiment 16. The composition of one of Embodiment 1, A1, B1 or C1, or the method of one of Embodiments M1, MA1, MB1 or MC1, or a combination with one or more of Embodiments 1-22, further comprising 10% wt/wt or less of surfactant (or 5% or less, or 3% or less).

Embodiment 17. The composition of one of Embodiment 1, A1, B1 or C1, or the method of one of Embodiments M1, MA1, MB1 or MC1, or a combination with one or more of Embodiments 1-22, wherein the cleaning composition can be passed over a surface driven by a pressure drop effective to render the composition BBF cleaning effective.

Embodiment 18. The composition of one of Embodiment 1, A1, B1 or C1, or the method of one of Embodiments M1, MA1, MB1 or MC1, or a combination with one or more of Embodiments 1-22, wherein at least a majority of said particles of said superabsorbent polymer have a ratio of corner radius of curvature to maximum overall dimension that is less than 0.3 (or less than 0.2).

Embodiment 19. The composition of one of Embodiment 1, A1, B1 or C1, or the method of one of Embodiments M1, MA1, MB1 or MC1, or a combination with one or more of Embodiments 1-22, wherein at least a majority of said particles of said superabsorbent polymer have a corner whose included angle is less than 70 degrees (or less than 60 degrees)(or less than 45 degrees).

Embodiment 20. The composition of one of Embodiment 1, A1, B1 or C1, or the method of one of Embodiments M1, MA1, MB1 or MC1, or a combination with one or more of Embodiments 1-22, wherein at least a majority of said particles of said superabsorbent polymer have a ratio of maximum dimension to minimum dimension that is greater than 2 (or greater than 3)(or greater than 4).

Embodiment 21. The composition of one of Embodiment 1, A1, B1 or C1, or the method of one of Embodiments M1, MA1, MB1 or MC1, or a combination with one or more of Embodiments 1-22, wherein the concentration of MF is less than the concentration of PSAP (dry weight to composition wt)(such.

Embodiment 22. The composition of one of Embodiment 1, A1, B1 or C1, or the method of one of Embodiments M1, MA1, MB1 or MC1, or a combination with one or more of Embodiments 1-22, wherein if the composition flows through a the 6-ft length (182.88 cm) of 3.2 mm tubing coated with BBF at a flow rate of 5 mL/min, and if a 5 cm segment is sampled from the middle of the tubing, the BBF is removed in period of flow through the segment of less 3 minutes.

Embodiment MD1. The method of any of the cleaning method embodiments (including any combination recited above), wherein the surface to be cleaned is skin.

Embodiment MD2. The method of any of the cleaning method embodiments, wherein the skin is cleaned for surgical prep.

Embodiment MD3. The method of any of the cleaning method embodiments, wherein a wound is debrided.

Embodiment MD4. The method of any of the cleaning method embodiments, wherein acne affected skin is cleaned.

Embodiment MD5. The method of any of the cleaning method embodiments, wherein a portion of the oral cavity is cleaned.

Embodiment MD6. The method of any of the cleaning method embodiments, wherein teeth are cleaned.

Embodiment MD6. The method of any of the cleaning method embodiments, wherein gums are cleaned.

Embodiment MD7. The method of any of the cleaning method embodiments, wherein the surface to be cleaned is a surface of a medical device, an oral cavity, a tooth, a surface of a precision cylinder, a surgical field, a cylinder-engaging surface of a piston, a food preparation surface, skin, mucosa, a surface of a gem, a glass surface, a cutting blade surface, a prosthesis, a wound, a filtration membrane, semiconductor material, a heat exchanger tube, a pipe, a cutting tool, or a moldy portion of a building Embodiment MD8. The method of any of the cleaning method embodiments, wherein nasal tissue is cleaned for nasal decolonization.

Embodiment MD9. The method of any of the cleaning method embodiments, wherein a wound area is treated for wound treatment or management.

Embodiment MD10. The method of any of the cleaning method embodiments, wherein skin is cleaned to address skin dehydration.

Embodiment MD11. The method of any of the cleaning method embodiments, wherein the surface to be cleaned or the effect sought is one or more of the following: skin, decolonization, cleaning and treatment; handwashing; full body bathing; body washing; implants; wound management; endoscopes; food surfaces; filling lines; sinus; channel; medical device; lumen; acne treatment; bathroom surfaces; skin prep before and after catheter placement; mucosal tissue; skin debridement; sinks; mold removal; *Clostridium difficile* spore cleaning and removal; surface in hospital and healthcare facilities; other applications irrespective of surface composition or geometries Embodiment MD12. The method of any of the cleaning method embodiments, wherein the surface to be cleaned is an inner surface of a channel of an endoscope of i.d. of 4 mm or less.

Embodiment MD13. The method of any of the cleaning method embodiments, wherein the surface to be cleaned is an inner surface of a channel of an endoscope of i.d. of 2 mm or less.

Embodiment MD14. The method of any of the cleaning method embodiments, wherein the surface to be is on the exterior of an endoscope.

Embodiment MD15. The method of any of the cleaning method embodiments, wherein a medical implant is cleaned outside a patient body.

Embodiment MD16. The method of any of the cleaning method embodiments, wherein a medical implant is cleaned in situ in a patient body.

Embodiment MD17. The method of any of the cleaning method embodiments, wherein a pipe interior is cleaned.

Embodiment MD18. The method of any of the cleaning method embodiments, wherein a metal is cleaned.

Embodiment MD19. The method of any of the cleaning method embodiments, wherein jewelry is cleaned.

Embodiment MD20. The method of any of the cleaning method embodiments, wherein a solid inorganic material is cleaned.

Embodiment MD21. The method of any of the cleaning method embodiments, wherein a non-endoscope medical device is cleaned.

Further Misc.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more. If there are two ranges mentioned, such as about 1 to 10 and about 2 to 5, those of skill will recognize that the implied ranges of 1 to 5 and 2 to 10 are within the invention.

Where a sentence states that its subject is found in embodiments, or in certain embodiments, or in the like, it is applicable to any embodiment in which the subject matter can be This invention described herein is of a cleaning composition and methods of forming or using the same. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims. More specifically, those of skill will recognize that any embodiment described herein that those of skill would recognize could advantageously have a sub-feature of another embodiment, is described as having that sub-feature Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A cleaning composition comprising:

(a) a carrier fluid;

(b) particles of particulate superabsorbent polymer provided in the carrier fluid, wherein the particulate superabsorbent polymer has sufficient crosslinking to reduce coalescence of the particles of particulate superabsorbent polymer when the particles of particulate superabsorbent polymer are provided in the carrier fluid and when the particles of particulate superabsorbent polymer are provided in a swollen form; and (c) a material that forms a network;

wherein the composition is traditional biofilm (TBF) cleaning effective or build-up biofilm (BBF) cleaning effective on a surface when the composition is caused to flow over the surface; and wherein the cleaning composition is in a flowable form and has a storage modulus G' at 0.1 percent shear strain of 200 Pa or higher, and a yield shear stress of 1 Pa or more.

2. The cleaning composition of claim 1 wherein:

the particulate superabsorbent polymer comprises at least one of surface crosslinked superabsorbent polymer, bulk crosslinked superabsorbent polymer, or both surface crosslinked superabsorbent polymer and bulk crosslinked superabsorbent polymer.

3. The cleaning composition of claim 1 wherein:

a majority of the particles of particulate superabsorbent polymer have sharp edges and flat surfaces.

4. The cleaning composition of claim 1 wherein:

a majority of the particles of particulate superabsorbent polymer have a ratio of corner radius of curvature to maximum overall dimension that is less than 0.3.

5. The cleaning composition of claim 1 wherein:

the particulate superabsorbent polymer comprises at least one of polyacrylic acid, polyacrylate salt, polyacrylamide, starch-acrylamide, or a copolymer of acrylamide and potassium acrylate.

6. The cleaning composition of claim 1 wherein:

the particulate superabsorbent polymer has a centrifuge retention capacity (CRC) in solution of about 16 to about 32 g/g.

7. The cleaning composition of claim 1 wherein:

the particulate superabsorbent polymer has a centrifuge retention capacity (CRC) in deionized water of about 30 to about 500 g/g.

8. The cleaning composition of claim 1 wherein:

the particulate superabsorbent polymer has a dry particle size of about 2 to about 800 micrometers.

9. The cleaning composition of claim 1 wherein:

the composition has a yield shear stress of greater than 5 Pa.

10. The cleaning composition of claim 1 wherein:

the composition has a storage modulus G' at 0.1 percent shear strain of 500 Pa or higher.

11. The cleaning composition of claim 1 wherein:

the composition storage modulus G' is greater than a composition loss modulus G" at 0.1 percent shear strain.

12. The cleaning composition of claim 1 wherein:

the composition has a solids fraction of at least about 55%.

13. The cleaning composition of claim 1 wherein:

the composition is substantially at a percolation volume fraction or higher.

14. The cleaning composition of claim 1 wherein:

the composition further comprises a surfactant comprising at least one of an anionic surfactant, a cationic surfactant, a nonionic surfactant, an amphoteric surfactant, or a zwitterionic surfactant.

15. The cleaning composition of claim 1 wherein:

the composition further comprises solid particles.

16. The cleaning composition of claim 15 wherein:

the solid particles comprise microcrystalline cellulose or silicified microcrystalline cellulose.

17. The cleaning composition of claim 15 wherein:

the solid particles comprise at least one of precipitated calcium carbonate, calcium carbonate, calcium phosphate, fluorophosphate, hydroxyapatite, fluorosphosphate, alumina, silica, colloidal silica, silica gel, crushed cashew nut, crushed olive pits, olive stone, wool fiber, viscose fiber, olive stone grit, crystalline material, amorphous material, particles comprising mixed crystalline and amorphous phases, and other insoluble or poorly-soluble materials.

18. The cleaning composition of claim 15, wherein:

the solid particles comprise solid polymers or non-polymer solid particles.

19. The cleaning composition of claim 1 wherein:

the carrier fluid comprises an aqueous fluid.

20. The cleaning composition of claim 1 wherein:

the composition further comprises at least one of a dispersant; a solvent; a cosolvent; a humectant; a pH adjuster; a buffer; a builder; a chelating agent; an antimicrobial agent; an antibiotic; a drug; an antiseptic; a disinfectant; a biocide; a virucide; an algicide; a prion-inactivating agent; an antifungal; an antiparasitic; a sporicide; a fungicide; an alcohol; an aldehyde; a quaternary ammonium compound; a viscosity modifier; a gel-forming substance; a hygroscopic additive; a preservative; and an adjuvant.

21. The cleaning composition of claim 1, further comprising a substance selected from the group consisting of: propylene glycol; hexylene glycol; butylene glycol; glyceryl triacetate; neoagarobiose; sugar alcohols (sugar polyols)

such as glycerol, sorbitol, xylitol, maltitol; polyvinyl alcohol; polyethyleneglycol; hydroxypropylmethylcellulose; polyacrylic acid; and polyvinyl pyrrolidone.

22. The cleaning composition of claim 1, further comprising a humectant.

23. The composition of claim 1, further comprising a fluoride either in soluble form such as sodium fluoride or a fluorophosphate, or in particulate form such as fluoride-containing abrasive particles.

24. The cleaning composition of claim 1, wherein the cleaning composition is formulated to clean a surface of a medical device, an oral cavity, a tooth, a surface of a precision cylinder, a surgical field, a cylinder-engaging surface of a piston, a food preparation surface, skin, mucosa, a surface of a gem, a glass surface, a cutting blade surface, a prosthesis, a wound, a filtration membrane, semiconductor material, a heat exchanger tube, a pipe, a cutting tool, or a moldy portion of a building, poultry, meat surfaces or other biological tissue or food.

25. The cleaning composition of claim 1, wherein the cleaning composition is formulated to be used for tooth cleaning, oral cavity cleaning, treating mucosa, skin cleaning, skin treatment, wound debridement, acne treatment, skin dehydration, nasal decolonization, biofilm removal, surgical preparation, site preparation for implanting a needle or catheter, as a hand wash, as a body wash, as a nasal canal wash, to remove biofilms or bioburden from breast implants or other medical implants before surgery, or during revision surgery after implantation, decontaminating or decolonizing other mucosal tissues including oral, intestinal, eye, urinary tract and tissue of the reproductive tract in either men and women, or as a cosmetic.

26. The cleaning composition of claim 1, wherein:
the material that forms a network comprises thicker fibrils from which branch thinner fibrils.

27. The cleaning composition of claim 26 wherein:
the thicker fibrils have a diameter of about 250 to about 10,000 nm and the thinner fibrils have a diameter of about 10 to about 90 nm.

28. The cleaning composition of claim 26 wherein:
the material comprising thicker fibrils from which branch thinner fibrils comprises at least one of cellulose or a synthetic material.

29. The cleaning composition of claim 1, wherein:
the material that forms a network forms an entangled network.

30. The cleaning composition of claim 1, wherein:
the particles of particulate superabsorbent polymer provided in the swollen form have a volume at least 10 fold its dry particulate form.

31. The cleaning composition of claim 1, wherein:
the particles of particulate superabsorbent polymer comprise carbopol.

32. The cleaning composition of claim 1, wherein:
the particles of particulate superabsorbent polymer have a size of less than 2 microns in a the swollen form.

* * * * *